United States Patent [19]

Werson

[11] Patent Number: 4,668,983
[45] Date of Patent: * May 26, 1987

[54] OPTICAL INSPECTION SYSTEM

[75] Inventor: Michael J. Werson, Eastleigh, England

[73] Assignee: W. R. Grace & Co., New York, N.Y.

[*] Notice: The portion of the term of this patent subsequent to Jun. 4, 2002 has been disclaimed.

[21] Appl. No.: 800,175

[22] Filed: Oct. 29, 1985

Related U.S. Application Data

[63] Continuation of Ser. No. 740,939, Jun. 3, 1985, abandoned, which is a continuation of Ser. No. 397,716, Jul. 13, 1982, Pat. No. 4,521,807.

[30] Foreign Application Priority Data

Jul. 17, 1981 [GB] United Kingdom ............... 8122146

[51] Int. Cl.$^4$ .................... H04N 7/18; H04N 7/00
[52] U.S. Cl. ................... 358/106; 358/101; 382/8; 382/67
[58] Field of Search ............ 358/101, 106; 382/8, 382/67, 68; 250/223 B; 315/378; 335/213

[56] References Cited

U.S. PATENT DOCUMENTS

| | | | |
|---|---|---|---|
| 3,081,379 | 3/1963 | Yoshida | 358/106 |
| 3,624,284 | 11/1971 | Russell | 358/206 |
| 3,643,192 | 2/1972 | Chiodi | 335/213 |
| 3,840,293 | 10/1974 | Fine et al. | 358/206 |
| 3,902,811 | 9/1975 | Altman et al. | 358/156 |
| 4,002,823 | 1/1977 | Vom Dosterhout | 358/106 |
| 4,302,773 | 11/1981 | Yoshida | 358/106 |
| 4,326,808 | 4/1982 | Pryor et al. | 356/445 |
| 4,380,025 | 4/1983 | Deane | 358/106 |

FOREIGN PATENT DOCUMENTS

| | | |
|---|---|---|
| 2264030 | 7/1974 | Fed. Rep. of Germany . |
| 2916361 | 6/1980 | Fed. Rep. of Germany . |
| 2405460 | 4/1979 | France . |
| A4154404 | 12/1980 | Japan . |
| 2008887 | 6/1979 | United Kingdom . |

OTHER PUBLICATIONS

Encyclopedia on Cathode-Ray Oscilloscope and their Uses; John F. Rider & Seymour D. Uslan; Hayden Publishing Co. Inc., 1959; pp. 12-6, 7-73 and 7-78.

Pin Hole Detector for Mirror Finish Surface Using ITV Camera; Baba et al; 298 NEC Research & Development; No. 51 (1978, 10.).

Feinwerktechnik Und Messtechnik; vol. 89, No. 2; Mar. 1981; pp. 61-65; "Automatisierung von Sichtprüfungen".

"Automated Video Inspection"; Prothon, Division of Video Tek Inc.

Primary Examiner—Howard W. Britton
Assistant Examiner—John K. Peng
Attorney, Agent, or Firm—Roylance, Abrams, Berdo & Goodman

[57] ABSTRACT

An optical inspection system for the inspection of circular workpieces (1) includes an electronic camera (6) having an optical system (21) for focusing an image of a circular workpiece (1) on an electronically active image receiving surface (23), means (16) to move the circular workpiece (1) into a predetermined position in the field of view of the optical system (21) of the camera (6). When a conventional electronic camera is used to inspect circular workpieces it is very difficult to analyze the output signal from the camera since it corresponds to chords taken across the workpiece (1). To overcome this the present inspection system includes means (7) for scanning the image receiving surface in directions extending substantially radially across the image receiving surface to produce an output signal, and a signal analyzer (12) arranged to monitor the output signal corresponding to each radial scan to detect the presence of any irregularity in the workpiece.

79 Claims, 21 Drawing Figures

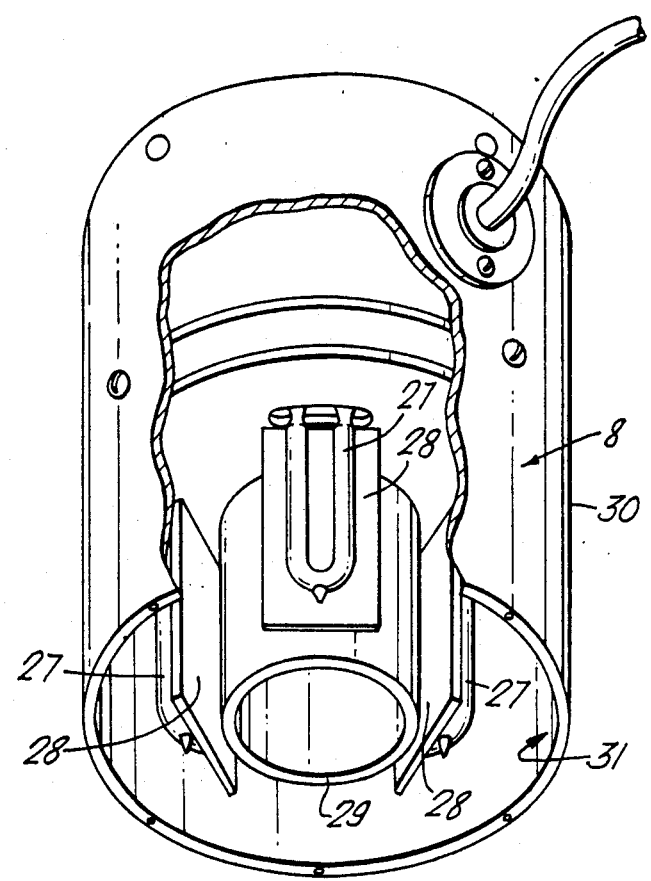
Fig. 6.
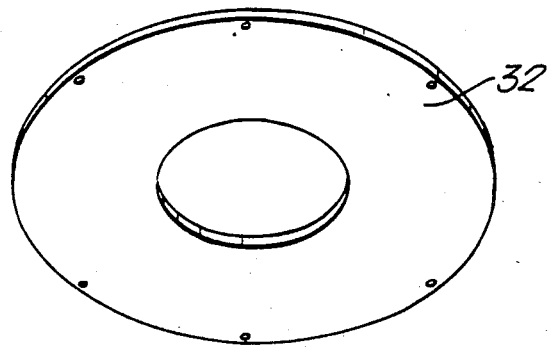

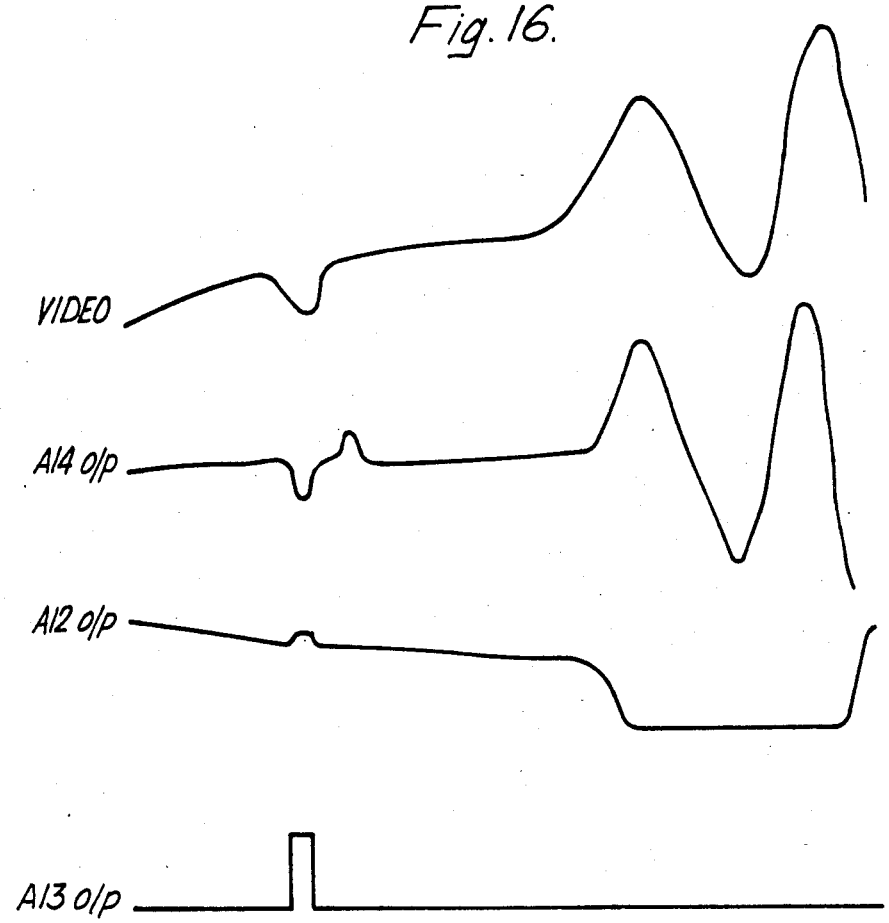

OPTICAL INSPECTION SYSTEM

This is a continuation of application Ser. No. 740,939, filed June 3, 1985, now abandoned, which is a continuation of application Ser. No. 397,716, filed 7/13/82, U.S. Pat. No. 4,521,807.

It is desirable to inspect workpieces automatically and it is preferred that this automatic scanning is carried out by apparatus that does not contact the workpiece. One way of achieving this is to inspect workpieces using a video camera and then to analyse the video signals output from the video camera to derive information with regard to the workpiece.

This technique has met with considerable success particularly when the purpose of the inspection is simply to monitor the external dimensions of an article or simply to monitor the location of an article on a conveyor. However, such a system has considerable shortcomings when trying to monitor with high precision articles of circular shape and particularly small articles or small features on such articles. The signal analysis that has to be performed on the video signals resulting from a conventional video inspection is very complicated when a circular workpiece is inspected. The circular image of the workpiece that is produced in a conventional video camera is scanned in a raster pattern formed by a series of closely spaced parallel lines. Thus, the video information that is obtained is information on a number of chordal paths extending across a circular workpiece. It is very difficult to analyse this chordal information to provide information with regard to the diameter or circularity of the workpiece and also it is particularly difficult to interpret this information when trying to monitor the width and position of any annular feature contained on the workpiece.

According to this invention an optical inspection system for the inspection of circular workpieces includes an electronic camera having an optical system for focusing an image of a circular workpiece on its electronically active image receiving surface, means to move circular workpieces into a predetermined position in the field of view of the optical system of the camera, means for scanning the image receiving surface in directions extending substantially radially across the image receiving surface to produce an output signal, and a signal analyser arranged to monitor the output signal corresponding to each radial scan to detect the presence of any irregularity in the workpiece.

Using the system in accordance with this invention the video output signal corresponding to each radial scan of a circular workpiece is substantially the same. This means that these output signals can be analysed much more readily to analyse the signals to monitor the radius or the circularity of the workpiece, or monitor the presence of any other feature that occurs, or should occur, at a predetermined distance along each radial scan. The signal analyser may be arranged to compare the output signals corresponding to each scan with succeeding scans to detect any changes or differences between them. Preferably the signals corresponding to each scan are monitored to determine the presence at the required position along each scan of each element of the workpiece and to determine the absence of any unexpected elements along each scan. To do this, the output signal corresponding to each scan may be compared with predetermined data corresponding to the output signal produced by the system when it inspects a perfect workpiece but preferbly the output signal correponding to each scan is monitored over different timing windows to detect the presence or absence of an event in each timing window.

Frequently, optical inspection systems are required to inspect a large throughput of workpieces and, in this case, it is preferred that the optical inspection system in accordance with this invention also includes an illuminating system capable of illuminating the workpiece for only a short period of time. This enables the means to move the workpieces to move them continuously past the optical system of the camera whilst the images of the individual workpieces that are formed on the electronically active image receiving surface of the camera are apparently "frozen" in position since, the period for which they are illuminated is so short that the image of the workpieces does not appear to move during the short time for which the workpiece is illuminated. The image of the workpiece that is formed on the image receiving surface creates a latent electronic image of the workpiece in the form of a charge distribution pattern which is subsequently scanned radially to produce the output signal.

Whilst it is possible to illuminate the workpiece using a mechanical system including a shutter or similar mechanical arrangement it is very much preferred to use some form of pulsed light source such as a gas discharge tube or laser. Such pulsed light sources typically have a pulse length of the order of 10,000th of a second and this is sufficiently short to "freeze" the movement of most workpieces. Preferably the system includes position sensing means to sense the position of the means to move the workpiece or the position of a workpiece at a predetermined position with respect to the camera to provide a triggering signal as the workpiece is moved into the field of view of the optical system of the camera. The triggering signal preferably triggers the operation of the illumination source and also triggers the scanning of the electronically active image receiving surface of the camera.

Preferably the latent electrical image formed on the image receiving surface of the camera is scanned from its centre and in the radially outwards direction. Preferably the electronically active image receiving surface of the electronic camera is a standard vidicon tube having standard X and Y axis deflection coils. In this case, the means for scanning the image receiving surface preferably include means to generate two signals having a sinusoidal waveform but being 90° out of phase and two ramp generators fed with the two signals having a sinusoidal waveform so that the output of the ramp generators are two saw tooth waveforms whose amplitudes are modulated by sine and cosine waveforms. The output signals from the ramp generators are fed to the X and Y axis deflection coils of the vidicon tube and these result in the electron beam of the vidicon tube scanning the target of the vidicon tube in a series of substantially radial outward sweeps starting at the centre and precessing around the target.

Instead of using a conventional vidicon tube it is possible to use other forms of video camera and it would also be possible to use a camera including a photodiode array or matrix or a charged coupled device array or matrix provided that the photodiode or charge coupled devices have a radial distribution.

This invention has a particular application as an optical inspection system for inspecting a crown cap for a bottle. Nowadays, a sealing material is moulded onto the inside of a crown cap for a bottle in the form of an annular rib which, in use, seals against the open end of the neck of the bottle and a thinner layer completely filling the centre of the annular rib to provide a surface coating over the inside of the crown cap. The inspection system in accordance with this invention is particularly good at inspecting such objects because it can readily monitor the radial width of the annular seal portion and also monitor the continuity of the surface coating over the inside of the cap. In addition to the inspection of the moulding the apparatus in accordance with this invention also checks the formation of the flutes in the side wall of the crown cap.

A particular example of an optical inspection system in accordance with this invention will now be described with reference to the accompanying drawings; in which:

FIG. 6 is a partly cut away exploded perspective view of the light source;

Figure 10A:
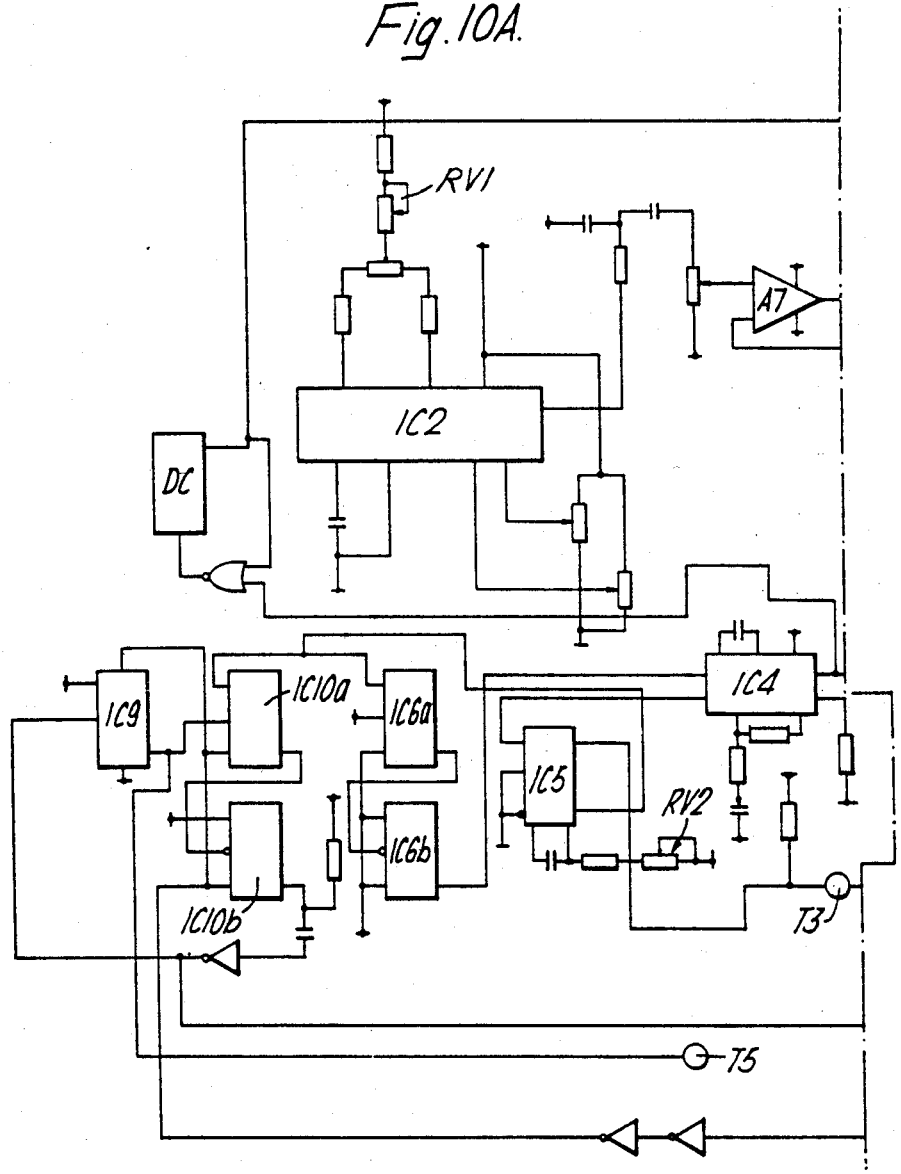
Figure 10B:
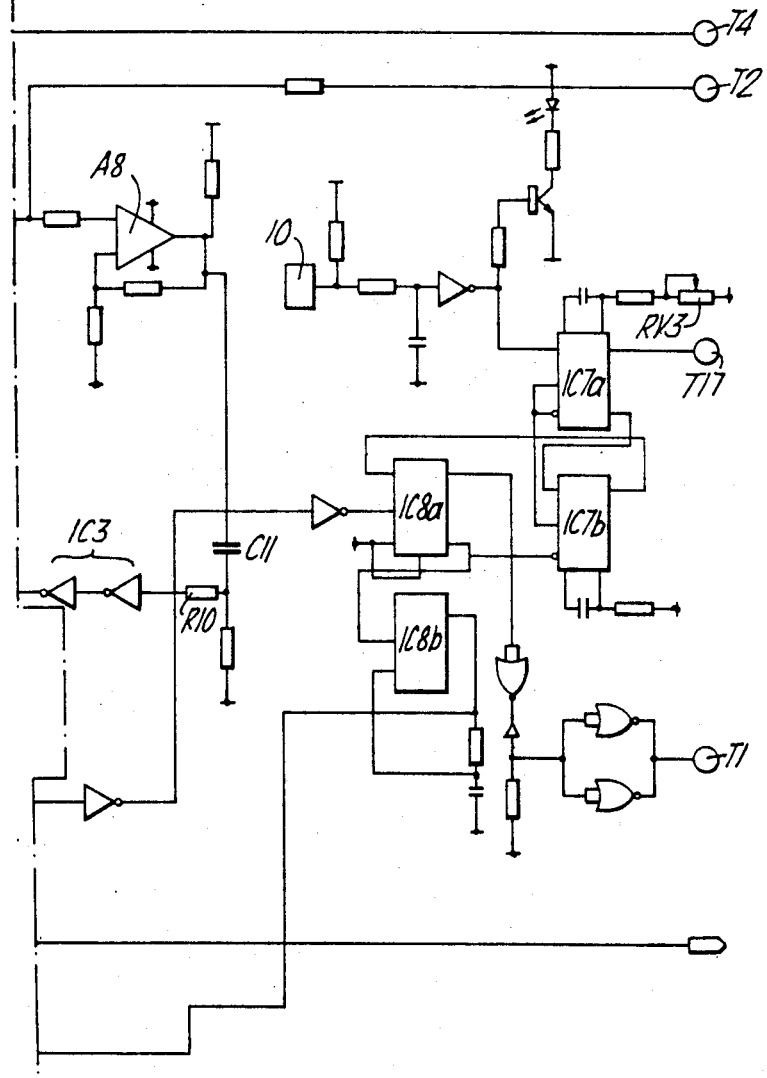
Figure 11A:
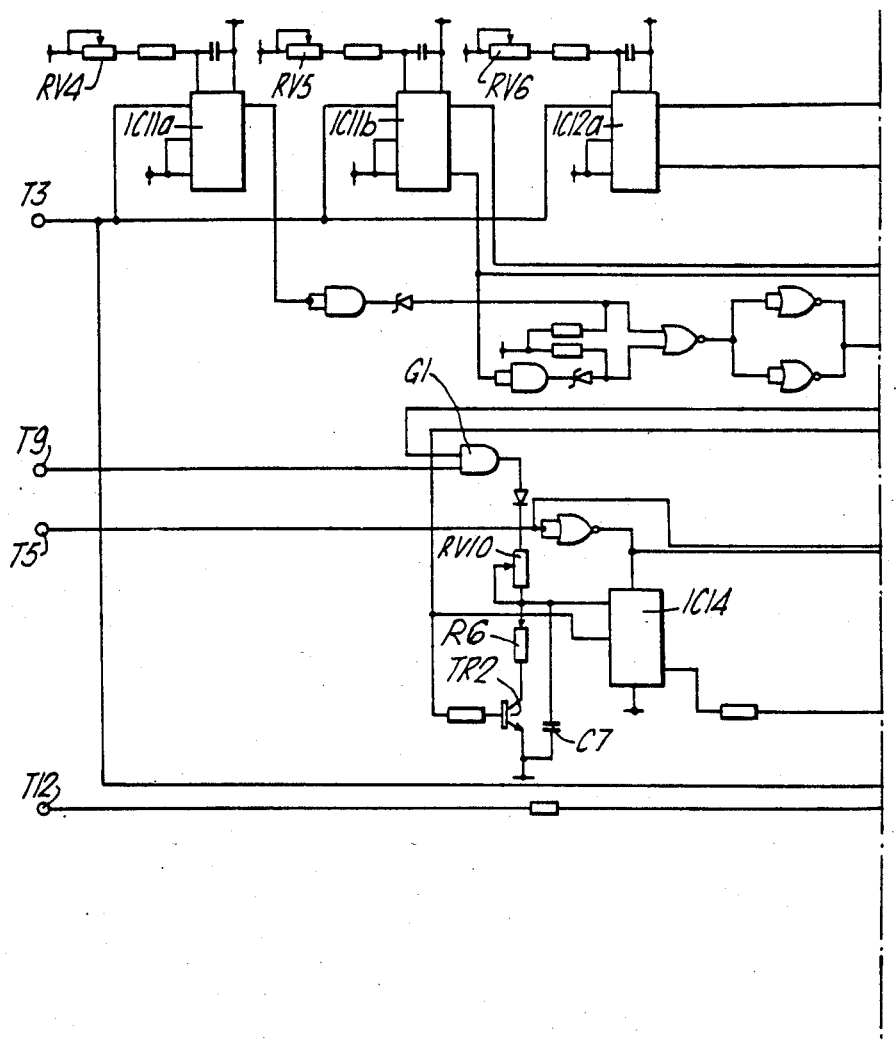
Figure 11B:
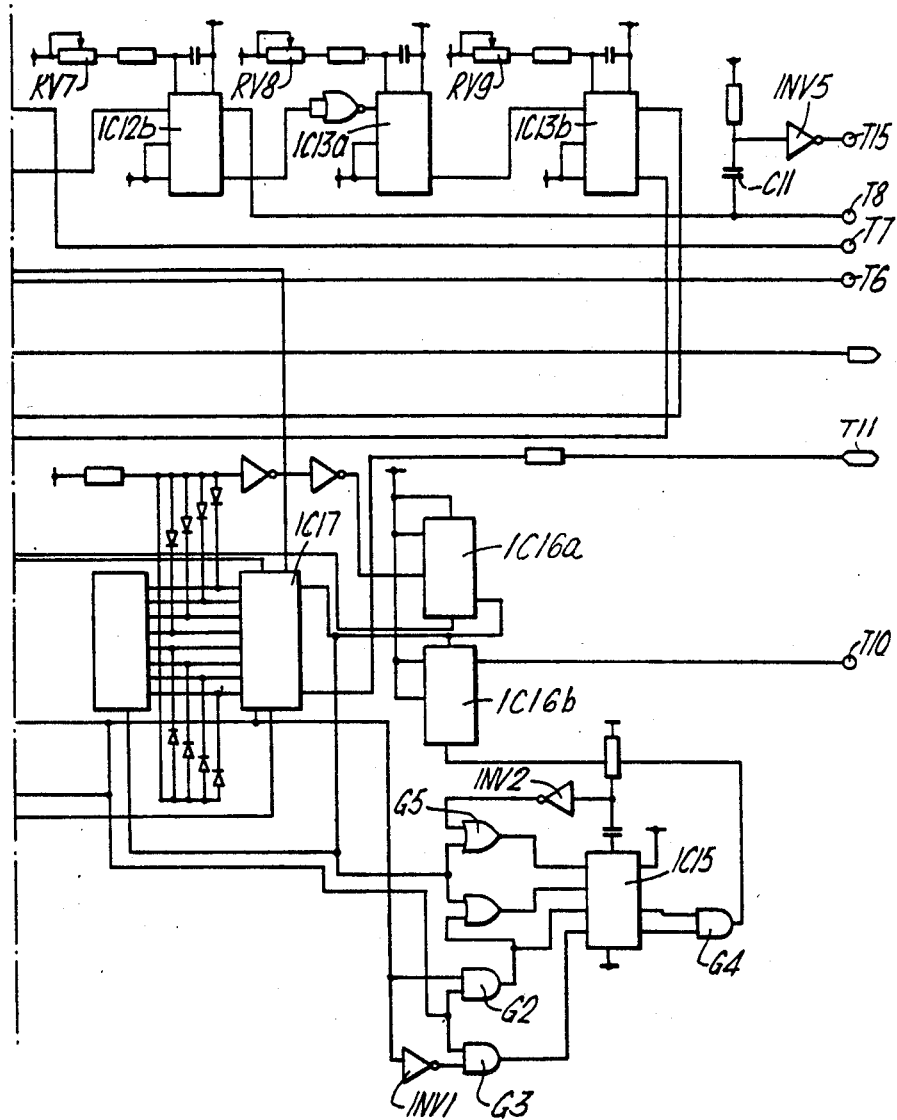
Figure 12A:
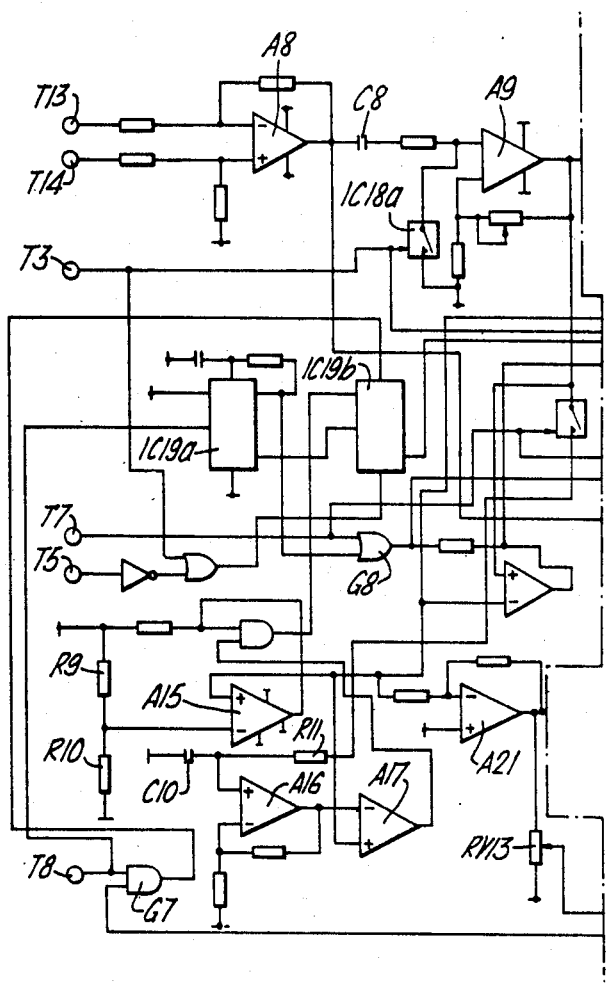
Figure 12B:
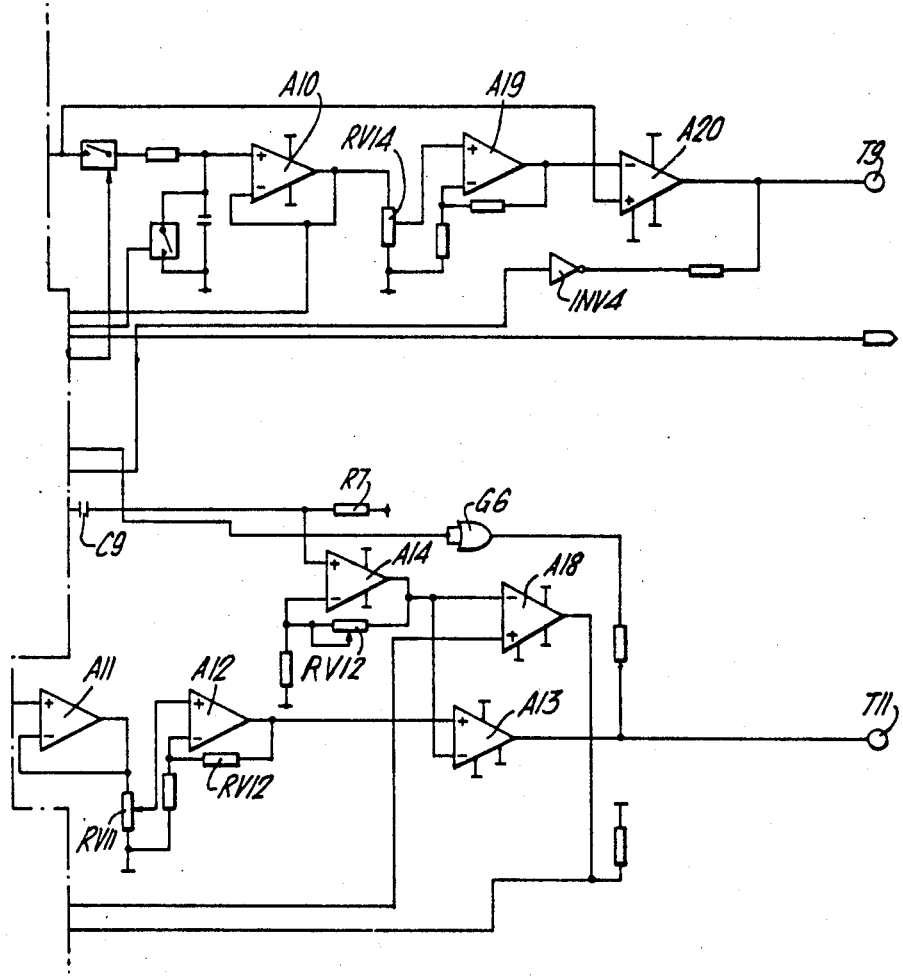
Figure 13A:
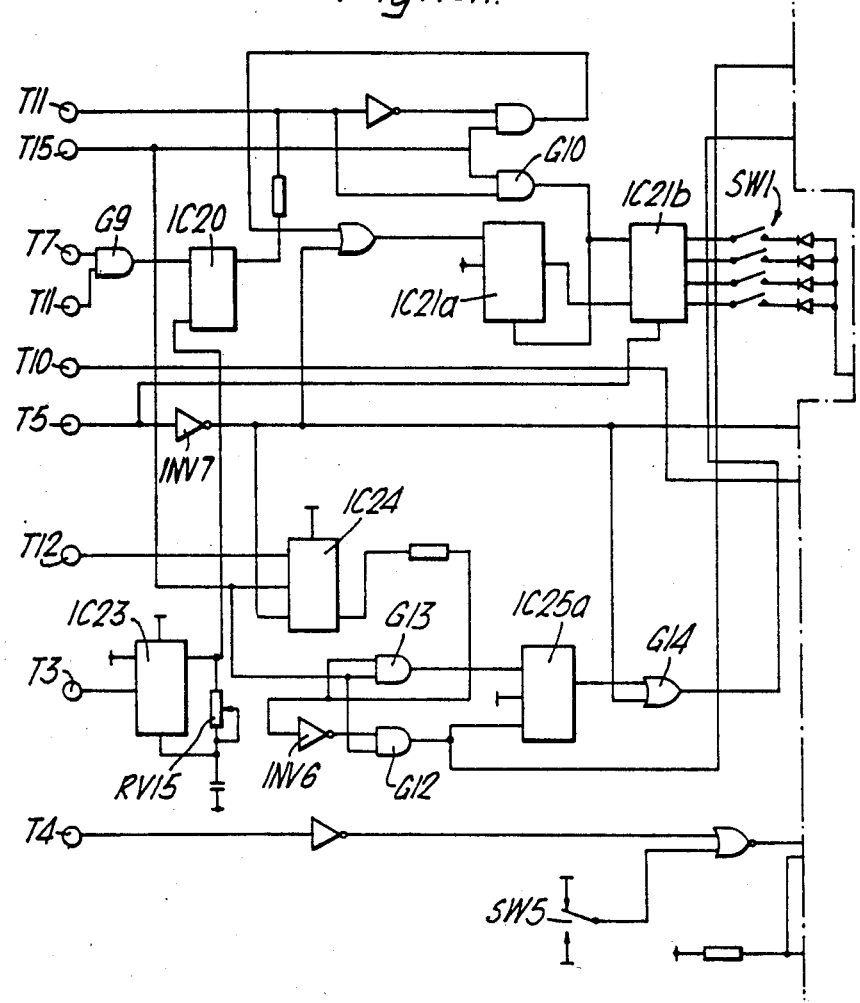
Figure 13B:
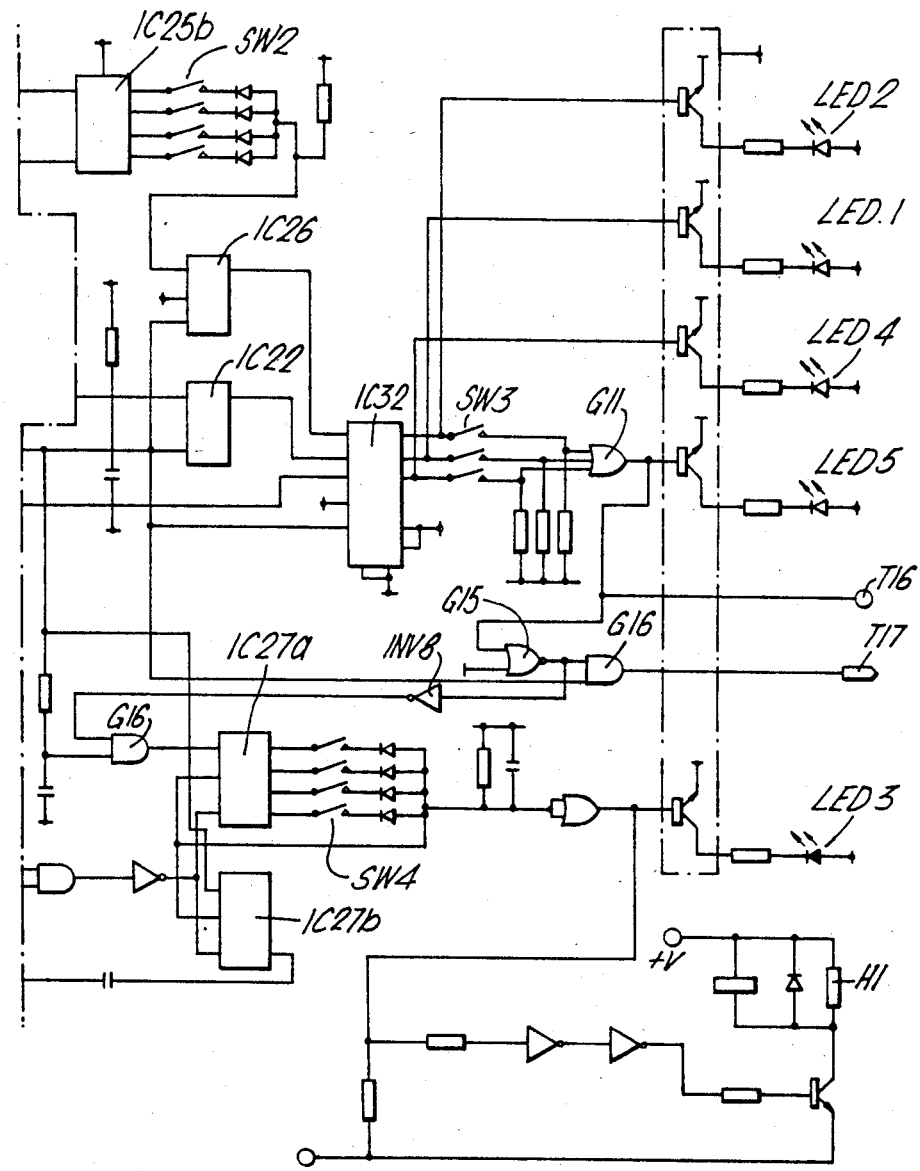
Figure 14:
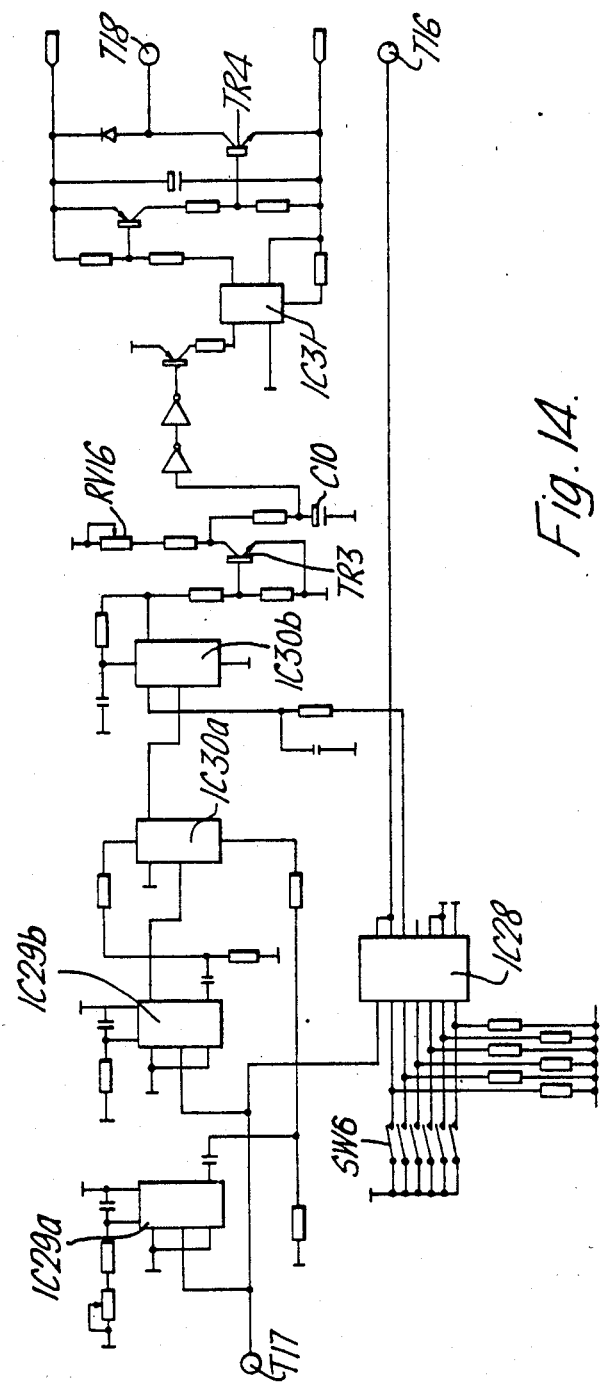
Figure 15:
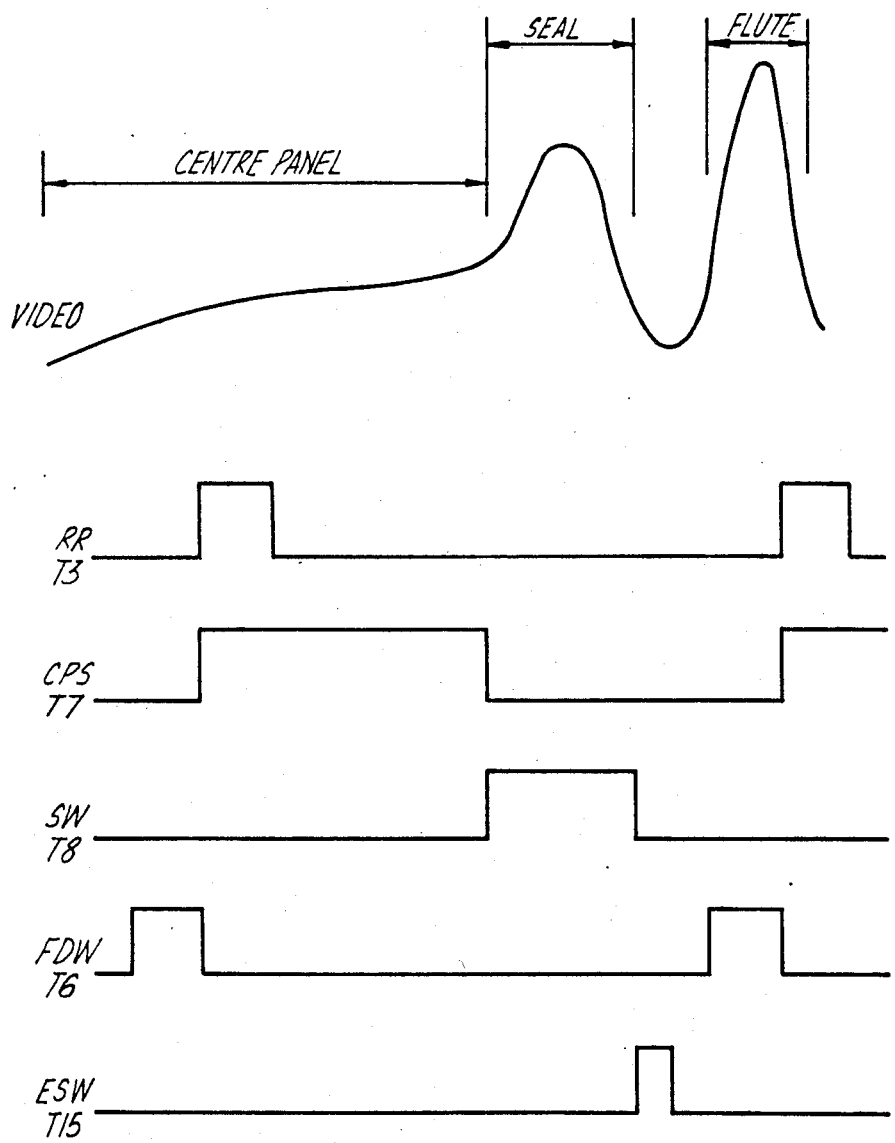

FIGS. 10A and 10B together form a circuit diagram of a first part of the synchronising electronics;

FIGS. 11A and 11B together form a circuit diagram of a second part of the synchronising electronics;

FIGS. 12A and 12B together form a circuit diagram of a first part of the signal analysis electronics;

FIGS. 13A and 13B together form a circuit diagram of a second part of the signal analysis electronics;

FIG. 14 is a circuit diagram of the reject driver circuit;

FIG. 15 is a series of waveform diagrams showing a typical video output signal and the waveforms which generate various timing windows; and, FIG. 16 is a series of waveform diagrams illustrating how the signal analysis electronics analyses the presence of a fault in the centre panel of a cap.

GENERAL DESCRIPTION

This particular example of optical inspection system in accordance with this invention is used to inspect completed crown-type bottle caps which are subsequently used to close the open end of a neck of a bottle. The crown-type bottle cap comprises a metal cap 1 with a crimped and fluted side wall 2. The closed end wall 3 of the cap has a sealing compound moulded onto it in the form of an annular upstanding rib 4 which, in use, seals against the open end of the neck of the bottle and a thinner coating of the sealing compound 5 filling the central portion of the annular rib 4 and covering the closed end wall 3 of the cap 1. The portion 5 provides an inert coating to cover the inside of the cap 1.

There are three important things that have to be inspected by the optical inspection system, first is that the central panel 5 of the sealing compound is uniform and free from any unwanted inclusions or breaks; the second is that the upstanding annular rib 4 is of sufficient width to form an effective seal with the open end of a neck of a bottle; and, the third is that the side wall 2 of the cap is crimped and fluted.

Figure 1:
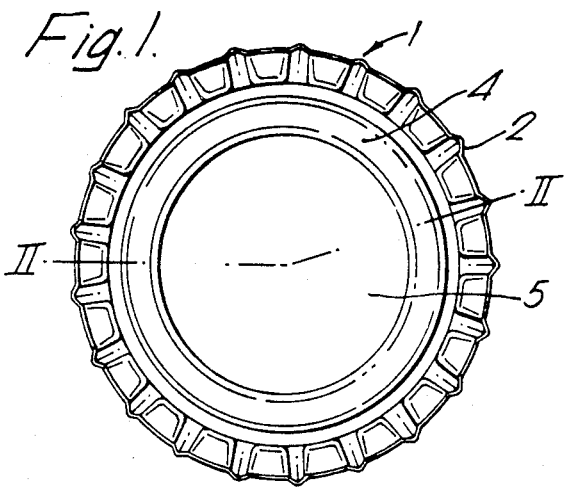
FIG. 1 is a plan of a crown cap.
Figure 2:
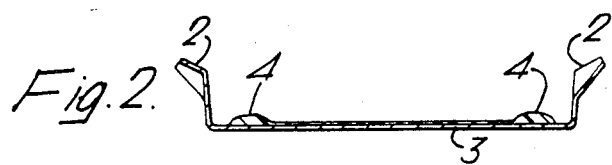
FIG. 2 is a dimetral cross-section through a crown cap.
Figure 3:
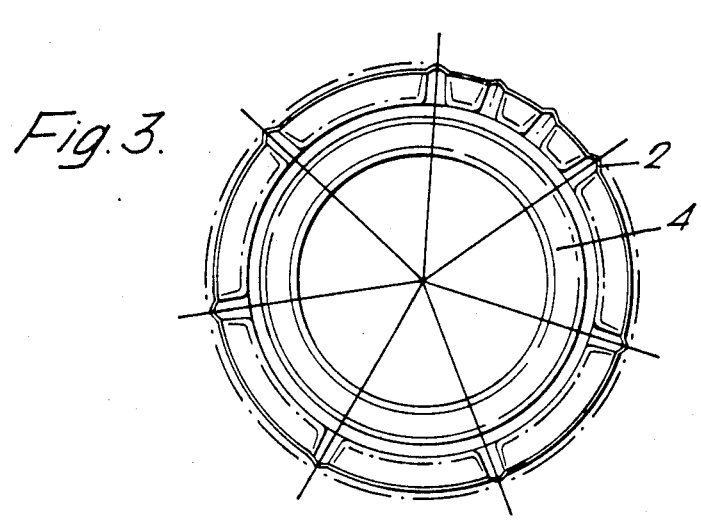
FIG. 3 is a diagrammatic representation illustrating how the image of a crown cap is scanned by the system.

In the system in accordance with the present invention the crown-type bottle cap is viewed by a video camera and the image of the bottle cap formed in the video camera is scanned in substantially radial directions and this is illustrated schematically in FIG. 3. By using such radial scanning techniques a substantially uniform video signal is obtained from each scan if the cap is correctly formed. The system is arranged so that the image of the cap is scanned radially from its centre 256 times with the radius of scanning moving around a complete circle, but in FIG. 3 only seven scanning lines are indicated. The video signals obtained are then analysed to determine if the cap is correctly formed and, if irregularities are detected, the cap is rejected.

Figure 4:
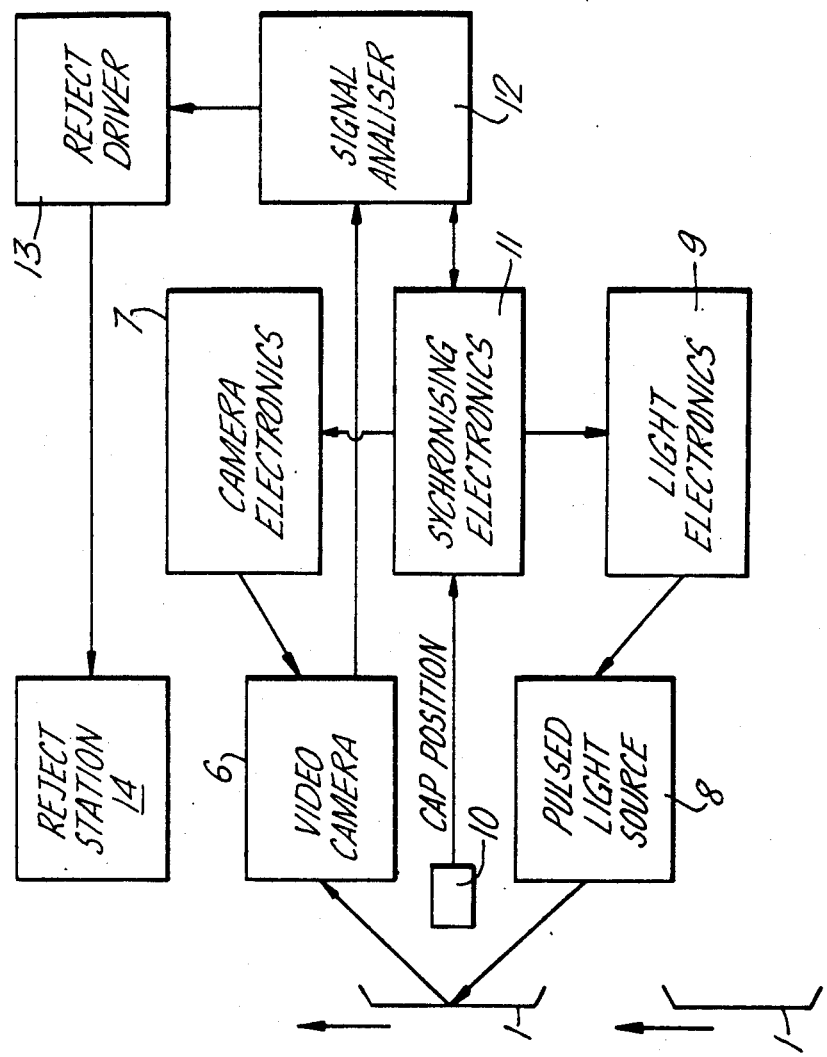
FIG. 4 is a block diagram of the system.
Figure 5:
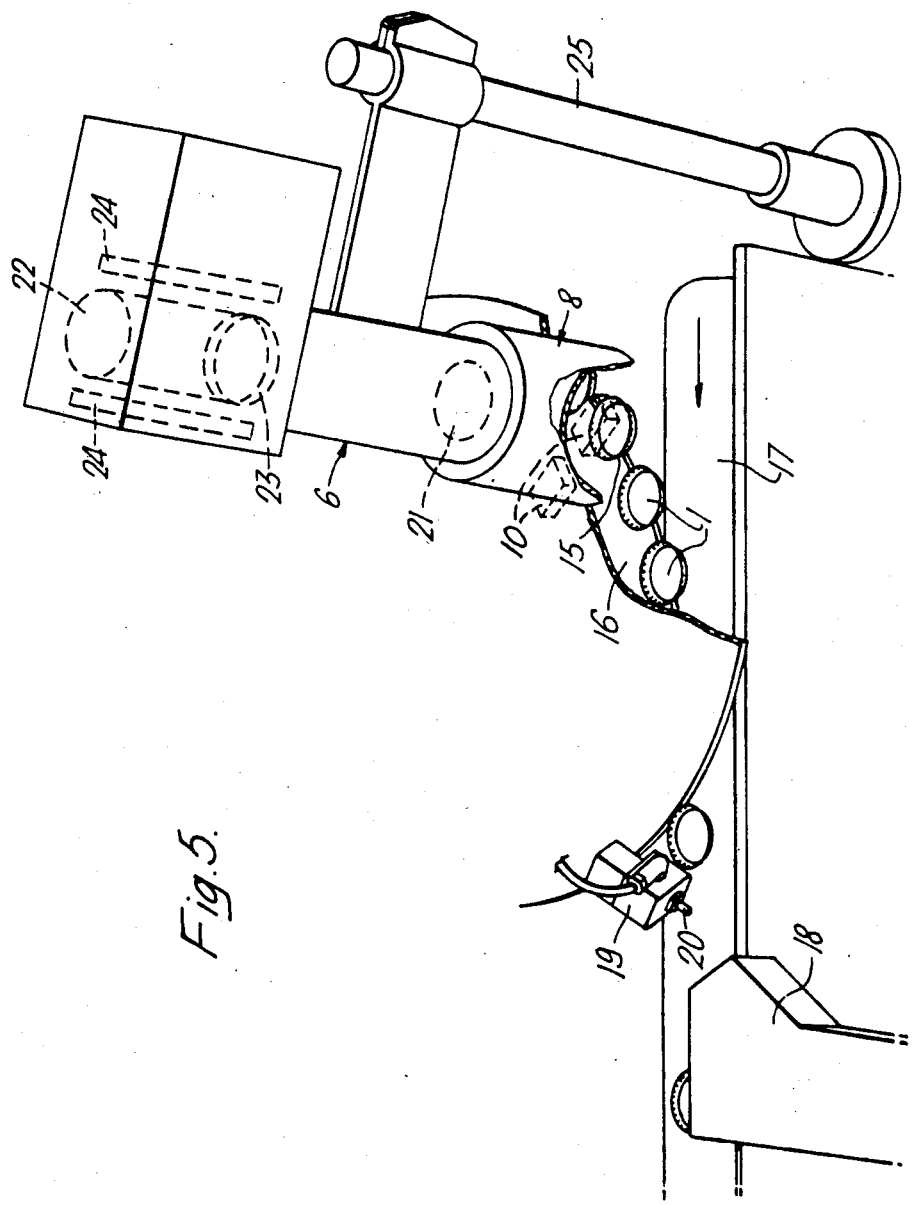
FIG. 5 is a partly cut away perspective view of the mechanical parts of the system.

The optical inspection system comprises, as shown in FIG. 4, a video camera 6, electronic circuits 7, required to power the camera including those that produce the radial scan, a pulsed light source 8, an electronic light control circuit 9 to drive the light source 8, a position detector 10, synchronising electronics 11, signal analysis electronics 12, a reject driver circuit 13, and a reject station 14.

MECHANICAL SYSTEM

Bottle caps 1 are fed from a seal moulding machine into recesses 15 in a rotating star wheel 16. A belt conveyor 17 passes beneath the periphery of the star wheel 16 and the caps 1 are taken away from the recesses 15 in the star wheel 16 by the belt conveyor 17. The belt conveyor 17 feeds a downstream collection plant. A reject chute 18 is located at the side and away from the belt conveyor 17 and leads to a reject bin (not shown). A solenoid operated air valve 19 is located above the belt conveyor 17 and includes a nozzle 20 to direct a blast of compressed air against any faulty crown 1 on the belt conveyor 17 to push it off the belt 17 and into the reject chute 18.

The video camera 6 including a lens system 21, a vidicon tube 22 having a target 23 and two pairs of deflection coils 24 arranged at right angles to one another, only one pair of which is shown, is mounted on a support column 25 so that the aperture of its lens system 21 is directly above the path of the centre of the caps 1. The light source 8 surrounds the end of the lens system 21 of the camera and is interposed between this and the star wheel 16. A photoemitter/photodetector pair 10 is located beneath the star wheel 16 so that the beam of light passing from the photoemitter to the photodetector is interrupted by the passage of a series of pins (not shown) depending from the star wheel 16 in angular positions corresponding to those of the receiver 15.

The structure of the video camera 6 is entirely conventional and the lens system 21 causes an image of the caps 1 to be focused on the sensitive face of the silicon target 23. A conventional focusing coil, its associated control circuitry, and a video amplifier are also provided in the video camera 6 and these are also entirely conventional in construction. The use of silicon as the target material of the vidicon tube is preferred in this system since it offers a low value of charge retention after scanning and this allows a high throughput rate of caps 1.

PULSED LIGHT SOURCE

The pulsed light source 8 comprises three high pulse rate flush tubes 27 with local diffusing elements 28 placed symmetrically around a cylindrical diffuser 29. The cylindrical diffuser 29 surrounds the lens system 21 of the video camera 6 so that the pulsed lighting system 8 is concentric with the video camera 6. The flash tubes 27 and diffusers 28 and 29 are mounted inside a cylindrical housing 30 having a high reflectivity inner surface 31. The lower end of the light source is covered by an annular end cover 32. The light source 8 is arranged to provide lighting which is uniform around the cap 1 but which is steeply inclined to the surface of the end wall 3 of the cap 1.

The operation of the flash tubes 27 is triggered by the pins (not shown) passing through the light path between the photodetector and photoemitter pair 10 as the next cap 1 approaches the optical system 21 of the camera 6 so that the flash tubes illuminate the cap 1 when it is directly beneath the video camera 6. The pulsed illumination provided by the light source 8 thus, effectively, freezes the movement of the caps 1.

Figure 7:
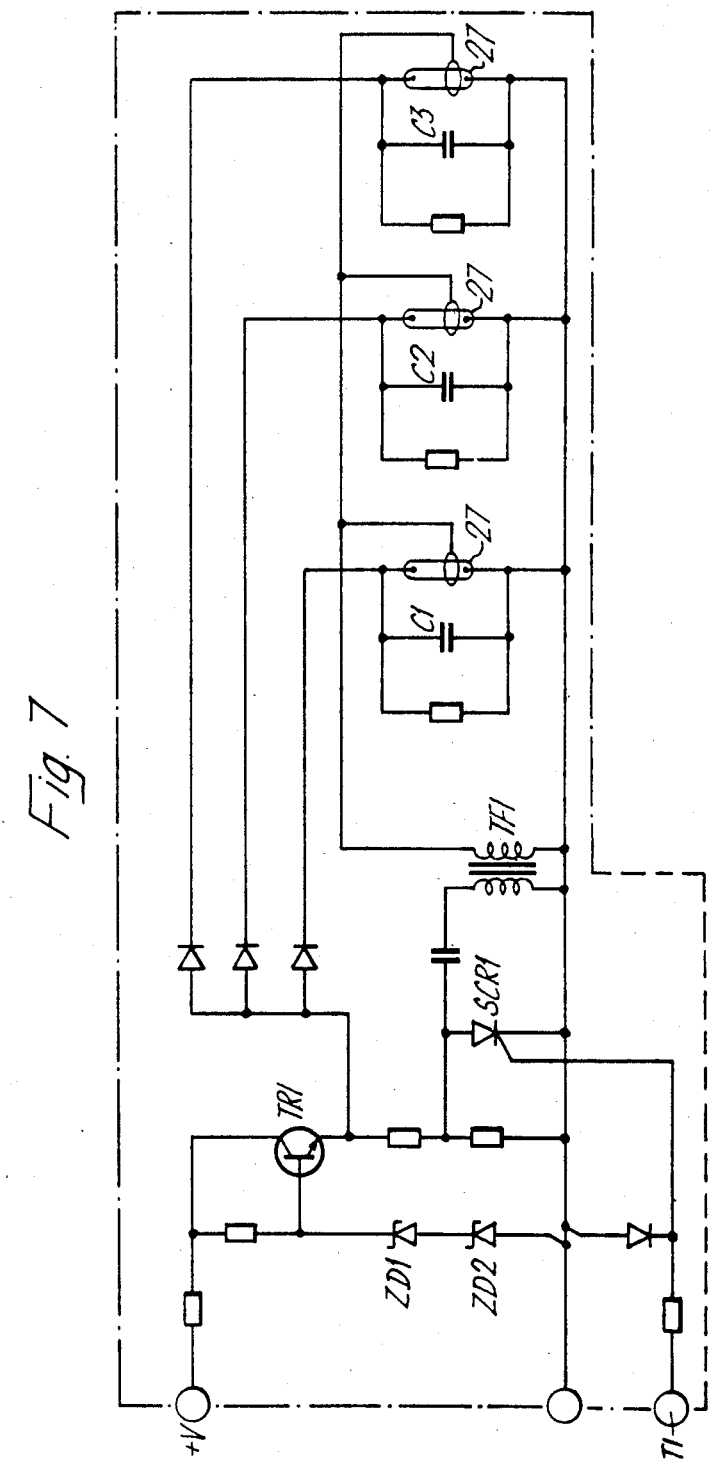
FIG. 7 is a circuit diagram of the light source.

The flush tubes 27 are operated by a capacitive energy storage-discharge system shown in FIG. 7. Two 150 volt zener diodes ZD1 and ZD2 control the voltage via a transistor TR1 that is supplied to charging capacitors C1, C2 and C3 connected in parallel across the flash tubes 27. A flash trigger pulse produced by the synchronising electronics 11 in response to the output from the photoemitter/photodetector pair 10 is applied to the gate of a thyristor SCR1 via the terminal T1. A high voltage is generated via the transformer TF1 and applied to the firing electrodes of the flash tubes 27.

RADIAL SCANNING CIRCUIT

Since a standard vidicon tube 21 and scanning deflecting coil assemblies 24 are used, the deflection coils 24 which would normally deflect the scanning beam in the X axis direction have less turns in them than the deflection coils 24 that would normally deflect the scanning beam in the Y axis direction.

A 50 Hz sine wave is fed from the synchronising electronics 11 via terminal T2 and a radius reset pulse from the synchronising electroincs 11 via terminal T3. The 50 Hz sine wave from terminal T2 is amplified by amplifier A1 and then fed to an integrator consisting of operational amplifier A2 and resistor and capacitor network R1, C4. The output from amplifier A1 is also fed to amplifier A3 with resistor R2 and capacitor C5 arranged to produce a phase shift of 90°. The output of the amplifier A3 is fed to a further amplifier A4 including an integrating network formed by a resistor R3 and capacitor C6. The output from amplifier A4 is thus 90° out of phase with the output from amplifier A2. Capacitors C4 and C6 have connected in parallel with them separate stages of an analogue switch IC1a and IC1b respectively. These stages of the analogue switch IC1 are controlled by the radius reset pulse supplied to terminal T3 so that, upon receipt of the radius reset pulse the analogue switch IC1 discharges the capacitors C4 and C6.

Figure 9A:
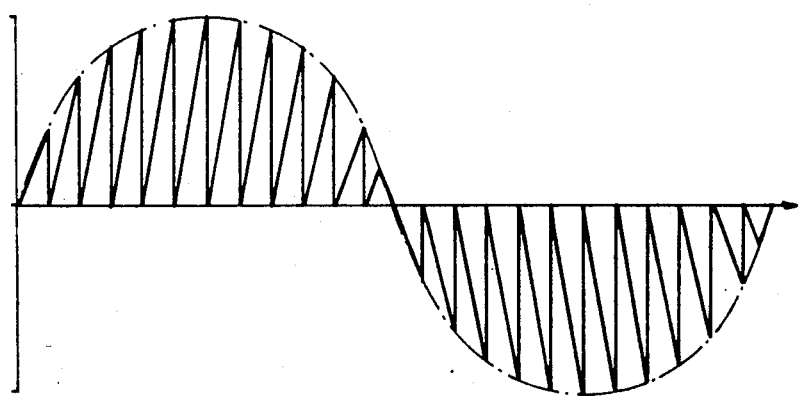
FIGS. 9A and 9B are two graphs illustrating the two waveforms generated by the circuit illustrated in FIG. 8.
Figure 9B:
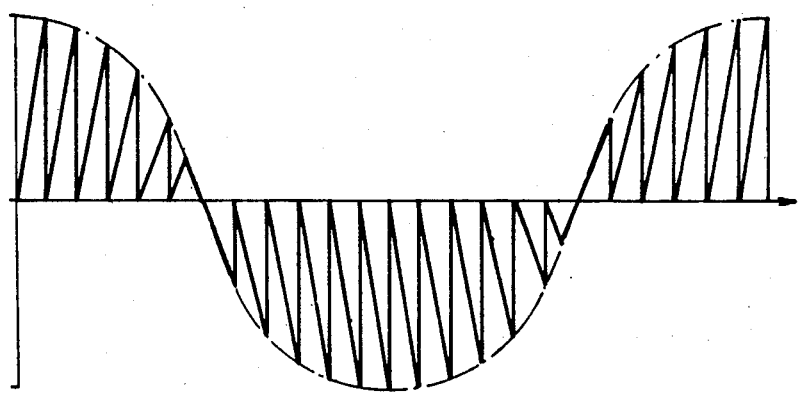

This produces a series of ramp functions the amplitudes of which are modulated by a sinusoidal envelope as the outputs of amplifiers A2 and A4. Thus, the waveform of the output of amplifiers A2 and A4 has a saw tooth configuration modulated by a sinusoidal envelope. FIG. 9 only represents the wave form diagrammatically because, in fact, for each complete cycle of the sinusoidal wave form there are 256 peaks of the saw tooth wave form. The outputs from amplifiers A2 and A4 are fed through further amplifiers A5 and A6 and corresponding push-pull output drive amplifiers feeding the X axis deflection coil 24 and the Y axis deflection coil 24, respectively. A feedback signal developed across resistors R4 and R5 are fed back to the amplifiers A5 and A6. The push-pull scan coil drive amplifier connected to the Y axis deflection coil 24 operates with a plus and minus 24 volt supply whereas the output push-pull drive amplifier for the X axis deflection coil 24 operates with a plus and minus 6 volt power supply. Thus, the higher voltage output is provided for the Y axis deflection coil than for the X axis deflection coil to take account of the difference in their number of turns.

The application of the sine and cosine modulated saw tooth waveforms to the X and Y axis deflection coils 24 of a conventional video camera deflect the scanning beam of electron in a radially outward path from the centre of the target 23. Thus, after the pulsed light source 8 and the lens system 21 have produced a latent electrical image in the form of a charge distribution pattern on the silicon target 23 this latent electrical image is subsequently removed from the target by the electron beam which is scanned radially outwards with each scan being angularly displaced from the previous scan as illustrated in FIG. 3.

SYNCHRONISING ELECTRONICS

Figure 8:
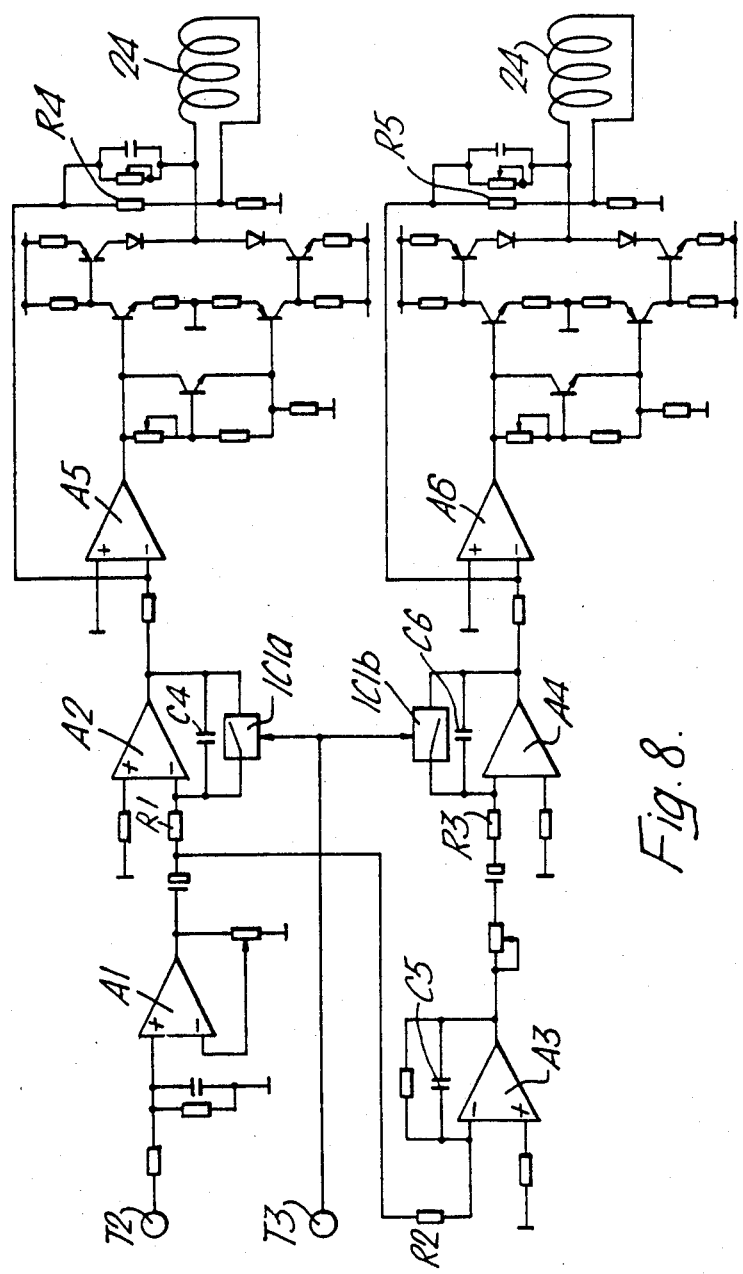
FIG. 8 is a circuit diagram of the circuit for generating a radial scan of the vidicon tube.

An integrated circuit sine wave oscillator IC2 having a frequency adjusting potentiometer RV1 feeds a 50 Hz sine wave through a buffer amplifier A7 to the terminal T2 from which, as already described, it is fed to the scan coil driver illustrated in FIG. 8. The 50 Hz sine wave is also fed to a zero crossing detector in the form of a Schmitt trigger circuit including an amplifier A8. The square wave output from the Schmitt trigger circuit is differentiated by resistor capacitor network R10, C11 to produce a short pulse at the output of the second stage of a double inverter IC3. This pulse occurs on the negative transition through zero of the 50 Hz sine wave and is used to produce a start of the modulated scan pulse (S.M.S). The SMS pulse output from IC3 is fed to a CMOS integrated circuit phase locked loop IC4. The oscillator output from the phase locked loop IC4 is fed to the clock input of the monostable multivibrator IC5. The Q output of the monostable multivibrator IC5 is fed to a divide by 256 counter IC6, formed by a dual four bit binary counters IC6a and IC6b connected one after the other. The output from the divide by 256 counter IC6 is then returned to the phase locked loop IC4 where it is compared with the SMS pulse by the phase comparator of the phase locked loop to complete the phase locked loop. Thus, the oscillator of the phase locked loop provides 256 output pulses in between each input SMS pulse i.e. between each complete cycle of the sine wave generated by the sine wave oscillator IC2. The Q output of the monostable multivibrator IC5 which forms the radius reset pulse is fed to the terminal T3 and from there to the scanning coil driver circuit shown in FIG. 8. The pulse width of the radius reset pulse is set by adjustment of the variable resistor RV2 to a pulse width of 10 μs.

The SMS pulses are also fed from the output of IC3 to a start up delay circuit DC not shown in detail. The start up delay circuit DC, at the conclusion of the start up delay circuit sends a constant signal to terminal T4.

As the star wheel 16 rotates the beam of light passing between the photodetector/photoemitter pair 10 is interrupted causing a falling edge on the output of the photodetector. This falling edge is fed to the clock input terminal of a first half IC7a of a dual monostable multivibrator IC7. The pulse duration of the monostable multivibrator IC7 is set by the variable resistance RV3 and, on relaxing the first half IC7 a of the dual monostable multivibrator IC7 initiates the second half IC7b to produce a "1" on the D input of the first part of a dual D flip flop IC8. The radius reset pulse is connected to the clock input of the flip flop IC8a so that upon receipt of the next radius reset pulse, the Q output of the flip flop IC8a goes positive providing a flash trigger pulse on output terminal T1 which is connected to the pulsed light source and capacitive energy storage-discharge system shown in FIG. 7, to cause a flash of light to be emitted by the flash tubes 27. The next radius reset pulse causes the resetting of the flip flop IC8a and thus the flash trigger pulse is one scan line in duration. At the same time as the end of the flash trigger pulse a start of scan pulse (SOS) is generated on the $\bar{Q}$ output of the second half IC8b of the dual D flip flop IC8. This SOS pulse is used to set the $\bar{Q}$ terminal of the flip flop IC9 to "1".

The oscillator output signal from the phase locked loop IC4 is also fed to a second dual four bit binary counter IC 10 which is also arranged to count 256 bits. The output from the counter IC10 is fed to the reset input of the flip flop IC9 to reset the flip flop IC9 after 256 radius reset pulses have been counted by the counter IC10. Thus, the signal output by the $\bar{Q}$ output of flip flop IC9 remains at "1" for one complete cycle of the sine wave oscillator IC2 and is called a scan duration pulse SD. The scan duration pulse is fed to output terminal T5.

The signal analysis circuit monitors the presence or absence of defects in the cap with reference to whether particular video events are present or absent during particular timing windows. The means to generate the timing windows are shown in FIG. 11 and comprise a sereis of monostable multivibrators. A first half IC11a of a dual monostable multivibrator IC11 is used to determine the fly back duration period which is set by variable potentiometer RV4. The radius reset pulse from the terminal T3 is used to clock the multivibrator IC11a and the output from the Q terminal of the multivibrator IC11a produces a fly-back blank pulse (F.B). This pulse is used to suppress the output from the vidicon tube during flyback of the scanning beam. The other half IC11b of the dual monostable multivibrator IC11 is arranged to produce the flute display window (FDW). This monostable multivibrator is also clocked from the radius reset pulse applied to terminal T3 and has connected to it variable potentiometer RV5 which enables the width of the flute display window to be varied. The signal to form the flute display window is taken from the $\bar{Q}$ output of the monostable multivibrator IC11b to terminal T6. The first part of a further dual monostable multivibrator IC12a produces a centre to seal pulse (CSP). The time period of this multivibrator is varied by the variable potentiometer RV6 and the clock input of this multivibrator again has the radius reset pulse from terminal T3 applied to it. The Q output from the multivibrator IC12a is fed to an output terminal T7. The $\bar{Q}$ output is fed to the other part of the monostable multivibrator IC12b. The time period of the monostable multivibrator IC12b is set by the variable potentiometer RV7 and this monostable multivibrator determines the duration of the seal window. The monostable multivibrator lC12b is clocked by the $\bar{Q}$ pulses from the monostable multivibrator IC12a and the Q output from the monostable multivibrator IC12b is fed to an output terminal T8. The output from the $\bar{Q}$ output of the monostable multivibrator IC12b is fed to the clock input of a further monostable multivibrator IC13a having a variable potentiometer RV8 arranged to control its period. This monostable multivibrator IC13a sets the seal to flute time (SFT) and the output from the $\bar{Q}$ terminal of this monostable multivibrator is fed to the clock input terminal of a monostable multivibrator IC13b, which sets the flute glimpse time pulses (SCG). The period of the monostable multivibrator IC13b is set by variable potentiometer RV9.

FIG. 11 also shows the flute counting and detection circuitry. Flute detection pulses are received via terminal T9 and these are gated, together with the flute glimpse time pulses taken from the Q output of monostable multivibrator IC13b in an AND gate G1. An output from AND gate G1 which represents the presence of a flute during the flute glimpse time window charges up capacitor C7 via variable potentiometer RV10. At the end of the flute glimpse time the rising edge of the output pulse from the $\bar{Q}$ output of the monostable multivibrator IC13b clocks the level on capacitor C7 into the D input of a D flip flop IC14 and this charges capacitor C7 via transistor TR2 and resistor R6. Thus, if a flute is detected during a flute glimpse time window the $\bar{Q}$ output of the flip flop IC14 will be low and if no flute is detected during this time period the $\bar{Q}$ output of the flip flop IC14 will be high. This signal from the $\bar{Q}$ output of IC14 is fed to an AND gate G2 and through an inverter INV1 to an AND gate G3. The radius reset pulse from the terminal T3 is also fed to AND gates G2 and G3 so that, in the presence of an output pulse on the $\bar{Q}$ output of IC14 an output is provided from AND gate G2 whereas if no output if present on the $\bar{Q}$ output of IC14 an output is provided from the AND gate G3. The signals from the AND gates G2 and G3 are fed into different stages of a counter IC15. If the absence of a flute is detected for twelve consecutive radial scans an output from the counter IC15b is fed through the AND gate G4 to the D flip flop IC16b. The absence of a flute for more than twelve radial scans sets the Q output of flip flop IC16b to a high level to signify a flute fault on output terminal T10. If at least two good consecutive flute signals are fed via the gate G2 into the counter IC15 before the count in the counter IC15 reaches 12 then the counter is reset via inverter INV2 and OR gate G5.

IC17 stores the condition of centre panel, seal and flute fault detection circuits during each radial scan. The centre panel and seal faults are input via terminals T11 and T12, respectively. The content of the memory IC17 is fed to fault counters to be described subsequently with reference to FIG. 12 during the time period when the target 23 of the vidicon tube 21 is cleared.

SIGNAL ANALYSIS CIRCUITRY

The signal analysis circuitry reaches a balanced video signal via input terminals T13 and T14 which are fed to a differential amplifier A8. A capacitor C8 and DC restoration circuit including the analogue switch IC18a which is reset by the radius reset pulses appearing on terminal T3. The resulting video signal is then further amplified in amplifier A9. This DC level resetting circuit ensures that the video signal fed to the analysis circuit is unaffected by changes in the DC signal level from the video camera 6.

The output from the amplifier A9 is fed to a peak detector including an amplifier A10 which holds the maximum video signal level generated during each radial scan The output of the amplifier A10 is inverted by inverting amplifier A21 and via two further amplifiers A11 and A12 to the non-inverting input of a voltage comparator formed by differential amplifier A13. The level of the signal applied to the non-inverting input of differential amplifier A13 can be varied by adjustment of the variable potentiometer RV11. The video signal output from the differential amplifier A8 is differentiated by a resistor capacitor network R7C9 and applied to the inverting input of differential amplifier A13. If a centre panel fault is present in the cap 1 the output of differential amplifier A13 pulses high due to a negative going spike from the differential network formed by resistor R7 and capacitor C9 being more negative than the DC level set by RV11. The output from differential amplifier A13 is fed to the output terminal T11 referred to earlier with reference to FIG. 11. The detection of a centre panel fault is illustrated graphically in FIG. 16.

Peaks also occur in the output from differential amplifier A13 at times outside the centre panel to seal time windows but the centre to seal pulse (CSP) on terminal T7 is fed via gate G8 to force the output from the differential amplifier A13 to zero at other times. The sensitivity of the centre panel defect detection circuit can not only be varied by adjusting the variable potentiometer RV11 but also the gain of the amplifier A14 forming part of the differentiator C9, R7 can be varied by adjustment of the variable potentiometer RV12.

A seal fault is detected in one of two different ways. Firstly, the peak video signal output by amplifier A9 is compared with a DC reference voltage determined by resistors R9 and R10 and compared with one another in differential amplifier A15. Seal window timing pulses are fed via terminal T8 to a seal fault latch formed by dual D flip flops IC19a and IC19b. If the output of differential amplifier A15 is low this forces a low level into the D input of seal fault latch IC19b to signify a seal fault. The other way in which a missing seal is detected is by the output from amplifier A9 being fed to a non-inverting integrator system including resistor R11 capacitor C10 and amplifier A16 until the end of the centre to seal window pulse. The output from amplifier A16 is fed to the inverting input of differential amplifier A17 whilst the peak video signal is fed to the non-inverting input of differential amplifier A17. Thus, if the seal does not exist the output of differential amplifier A17 will stay low during the seal window and this also puts a low level on the D input of flip flop IC19b, the seal fault latch. If the seal is present but includes some mark such as an unwanted inclusion the differentiated peak video signal value will exceed the non-differentiated value. To monitor this the output from inverter A21 is fed via variable potentiometer RV13 to the non-inverting input of a differential amplifier A18 whilst the output from the differentiator including the capacitor C9 resistor R7 and amplifier A14 is fed to the inverting input of the differential amplifier A18. In the presence of a mark on the seal the output from the amplifier A18 goes high and this output is gated via AND gate G7 with the seal window pulse applied on terminal T8. The output of AND gate G7 is fed to the seal fault latch formed by the D flip flop IC19b and output from AND gate G7 resets the seal fault latch IC19b to signify a seal fault.

To detect the flute faults the peak video signal output from amplifier A10 is fed via a variable potential divider RV14 to the non-inverting input of amplifier A19. The output from amplifier A19 is fed to the inverting input of a differential amplifier A20 and the video signal from amplifier A9 is fed to the non-inverting input of differential amplifier A20. Thus in the differential amplifier A20 the video signal is compared to a proportion as set by potential divider RV14 of the peak video signal for that line. If a flute is present, the video signal is greater than the peak value and accordingly the output from differential amplifier A20 is high. The output of differential amplifier A20 is forced to zero except from the middle of the seal window onwards as defined by inverter INV4 and OR gate G8 which is fed with a centre seal pulse from terminal T7. The output from differential amplifier A20 is fed to terminal T9 and to the flute counting arrangement already described with reference to FIG. 11.

The part of the signal analysis circuit that counts the occurrence of fault signals and controls the operation of the reject drive 13 is illustrated in FIG. 13. When a centre panel fault occurs a high signal is applied via terminal T11 to the input of AND gate G9. Another input to AND gate G9 comes from terminal T7 and is the centre panel to seal time window. Thus, if a centre panel fault is present during the time determined by the centre panel time window an output is provided from AND gate G9 to the set terminal of an RS flip flop IC20 which in turn takes the Q output of the RS flip flop IC20 high. The Q output of IC20 resets one part IC21a and increments the other part IC21b of a dual four bit binary counter IC21. The Q output from IC20 is fed to the counter IC21 via an AND gate G10 in which it is gated with an end of seal window pulse applied to terminal T15. The end of seal window pulse applied to terminal T15 is obtained by differentiating the seal window pulse appearing on terminal T8 with capacitor C11 and inverter INV5 shown on FIG. 11b. The outputs of the counter IC21b are fed to a selector switch SW1 and when the count incremented on counter IC21b exceeds that set by selector switch SW1 a signal is sent to the set input of RS flip flop IC22 which in turn, via a three-state latch IC32 lights a light emitting diode LED1 to indicate the presence of a centre panel fault and also provides a faulty crown indication on terminal T16 via OR gate G11. If two consecutive good scans are received by the counter IC21a before the count in IC21b reaches the value set by selector switch SW1 then counter IC21a resets counter IC21b so preventing a centre panel fault indication and corresponding faulty cap indication being given on terminal T16.

During each radial scan the part of the scan corresponding to the very middle of the centre panel section is blanked out using D flip flop IC23. This flip flop is clocked by radius reset pulses from terminal T3 and its delay period is set by variable potential divider RV15. The output from the D flip flop IC23 is fed to the reset input of RS flip flop IC20. Typically, the mould number of the mould forming the centre panel 3 and seal 4 on each cap 1 is moulded into the very centre of the central panel 3 and the presence of this mould number can appear to the optical inspection system as a fault and this can be overcome by varying the setting of variable potential divider RV15 to control the duration of the delay introduced by the flip flop IC23.

When a seal fault occurs, an input signal is provided via terminal T12 onto the D input of D flip flop IC24. The end of seal window pulse from terminal T15 is applied to the clock input of D flip flop IC24 so that the seal fault signal is clocked through the flip flop IC24 and the resultant low level on the $\overline{Q}$ output of D flip flop IC24 is applied to the reset output of a good seal counter formed by a first part IC25a of a dual four bit binary counter and to increment the other part IC25b of the dual four bit binary counter IC25 which forms a bad seal counter. The $\overline{Q}$ output from D flip flop IC24 is fed to the reset input counter IC25a through an inverter INV6 and an AND gate G12 where it is clocked with an end of seal window pulse from terminal T15. If no seal fault is present at terminal T12 the $\overline{Q}$ output is high and this is applied via AND gate G13 through which it is clocked by an end of seal window pulse from terminal T15, into the clock input of the good seal counter IC25a. If more faulty seal signals are detected during scanning of the same cap the good seal counter is reset and the bad seal counter incremented further. Selector switch SW2 is connected to the outputs of the bad seal counter IC25b and if the number of bad seal signals is greater than the number selected by the selector switch SW2 an output signal is provided to the set input of RS flip flop IC26. An output from the Q output of flip flop IC26 lights LED2 via the three-stage latch IC32 and again through OR gate G11 provides a faulty cap output signal on terminal T16.

If two consecutive good seal signals are received by the good seal counter IC25a before the bad seal counter IC25b is incremented to the setting selected by selector switch SW2 an output from the good seal counter fed via OR gate G14 is applied to the reset terminal of the bad seal counter IC25b to reset it. The scan duration pulse from terminal T5 after inversion by inverter INV7 is also applied to the OR gate G14 so that, at the end of each scan duration pulse the bad seal counter IC25b is reset and also the good seal counter is also reset since the input from inverter INV7 is also applied to the set input of D flip flop IC24 so causing the $\overline{Q}$ output to be low.

FIG. 13b also shows a faulty cap counter formed by a dual four bit binary counter IC27. Faulty cap signals from terminal T16 are fed through NOR gate G15 and an inverter INV8. The fault signal is then fed to an AND gate G16 where it is clocked by a scan duration pulse to terminal T5 into a first part of the dual four bit cap fault counter IC27a. The first part of the counter IC27a selector switch SW4 is connected to the outputs from cap fault counter IC27a and depending upon the setting of the selector switch, an output is provided from the selector switch when the number of cap faults is detected is greater than that selected by the selector switch SW4.

The other part of the dual four bit binary counter IC27b counts the scan duration pulses from terminal T5 and resets the cap fault counter IC27a every 16 scan duration pulses. Thus, if the number of faulty caps detected exceeds that set by the selector switch SW4 an alarm output is provided from the selector switch SW4. This triggers the lighting of an alarm light emitting diode LED3 and the triggering of an audible alarm via horn H1. This alarm can only be removed by manual actuation of an inhibit reset switch SW5 which applies reset pulses to the counters IC27.

Scan duration pulses from terminals T5 after inversion in inverter INV7 are also applied to an AND gate G16 where they are gated with the output of NOR gate G15 so that, in the absence of a faulty cap signal an output occurs from AND gate G16. This output signal is fed through terminal T17 to a cap counter.

The flute fault counter has already been described with reference to FIG. 11b. If a flute fault is detected a signal appears on terminal T10. This signal is applied via the three-state latch IC32 to a light emitting diode LED4 which indicates the presence of a flute fault and via the OR gate G11 to provide a faulty cap signal on output terminal T16. Light emitting diode LED 5 is illuminated upon each occasion that the cap is to be rejected. Whilst a cap is normally rejected in the presence of a centre panel fault, a seal fault or a flute fault, it is possible using a selector switch SW3 connected between the latch IC32 and the gate G11 to trigger a rejection signal only when two or more of these faults are detected.

REJECT DRIVER

The reject driver circuit is arranged to operate the solenoid of the solenoid operated air valve 19 to direct a jet of air through the nozzle 20 to flow faulty caps 1 down the reject chute 18. The jet of air must be given a predetermined time after the faulty cap has been detected to allow the cap sufficient time to move between the camera position and the position on the conveyor belt 17 adjacent the nozzle 20. To do this the reject driver circuit includes a shift register IC28 and a selector switch SW5 which selects the length of the shift register IC28 so that the delay provided by passage through the shift register IC28 can be varied. The passage of the cap fault signal from terminal T16 through the shift register IC28 is clocked by start of modulated scan pulses (SMS) received on terminal T17 from an output of IC7a shown in FIG. 9b. The SMS pulses are also fed to both stages of a dual monostable multivibrator IC29 which with the first stage IC30a of a dual D flip flop IC30 produce negative going pulses which are fed to the clock input of the second D flip flop IC30b. Cap fault signals leaving the output of the shift register IC28 are fed to the D input of the flip flop IC30b and these are clocked into the flip flop by the clock pulses from the flip flop IC30a. The D flip flop IC30b produces short 100 μs pulses at its Q output when a fault is present at the output of the shift register IC28 and these pulses discharge capacitor C10 via transistor TR3 to feed a current signal to the light emitting diode of a opto-isolator IC31. The capacitor C10 is recharged via potential divider RV16 which sets the duration of current flow in the light emitter of the opto-isolator IC31. The opto-isolator IC31 drives a solenoid drive transistor TR4 which in turn, through output terminal T18 actuates the solenoid valve 19.

WAVEFORM DIAGRAMS

At the top of FIG. 15 is illustrated the typical video waveform obtained as the result of a single radial scan of the target 23 of the vidicon tube 21. The video level across the centre panel 5 of the cap 1 gradually increases as a result of the gradual reduction in the extent of overlap of adjacent scans and then rises at the position of the seal. This increase in video level here is as a result of a greater thickness of sealing material at the location of the rib 4 giving a more intense signal. The video level falls at the end of the seal and then rises again upon detection of a flute of the side wall 2 which, in general, has a high reflectivity thus showing a higher peak video signal than that of the seal. Beneath this FIG. 15 shows the waveform diagrams of the timing pulses generated by the synchronising electronics. Thus, the next trace shows the radius reset pulses that appear on terminal T3, the next the centre scan pulses that are generated in monostable multivibrator IC12a and appear on terminal T7, seal window pulse that is generated in monostable multivibrator IC12b and appears on terminal T8, below that the flute display window which is generated by multivibrator IC11b and appears on terminal T6, and finally the end of the seal window pulse generated by the capacitor C11 and inverter INV5 which appears on terminal T15.

FIG. 16 illustrates the effect of a fault in the middle of the centre panel 5 of the cap 1. The top trace shows the video output from the vidicon tube during a scan containing the fault, the next trace shows the output from the peak video differentiator including capacitor C9, resistor R7 and amplifier A14 which is fed to the inverting input of the differential amplifier A13, the next trace shows the output from amplifier A12 which is a proportion of the peak video output by the peak detector including amplifier A10 and is fed to the non-inverting input of differential amplifier A13 and the bottom trace shows the output from differential amplifier A13 showing clearly an output pulse indicating the presence of the fault.

I claim:

1. An optical inspection system for the inspection of opaque circular workpieces, said inspection system comprising an electronic camera, said electronic camera including an electronically active image receiving surface and an optical system for focusing an optical image of said opaque circular workpieces on said electronically active image receiving surface; means to move said circular workpieces into a predetermined position in relation to said optical system of said camera; means for scanning said electronically active image receiving surface in directions extending substantially radially across said electronically active image receiving surface to produce an output signal; and analyzer means arranged to monitor said output signal corresponding to each of said radial scans whereby the presence of any irregularity in said workpiece is detected based on said analysis of details of said optical image of said opaque workpiece.

2. Apparatus for optically inspecting opaque circular workpieces comprising an electronic camera, means to continuously move said workpieces with respect to said camera, pulsed illumination means, means to trigger said pulsed illumination means each time a workpiece is in a predetermined position with respect to said camera to thereby permit said camera to create a static optical image of said moving workpiece, means to locate said electronic camera and said pulsed illumination means on one side of said workpiece so that light from said illumination means illuminates said workpieces to permit said electronic camera to produce said static optical image thereof, and means to radially scan said optical image of each workpiece between the center and the radially outermost portions thereof with a plurality of radial scans which rotate around the center of said circular workpiece.

3. The apparatus of claim 2, means to reject workpieces having irregularities determined during said radial scanning, and means to manually control the operation of said reject means based on faults found in a predetermined number of said radial scans and based on the absence of any fault found in others of said radial scans, whereby the quality level at which workpieces will be rejected can be controlled and set by said manual control means.

4. The apparatus of claim 2, said pulsed illumination means comprising a plurality of gas discharge tubes arranged in a circular array concentrically with respect to said camera, light diffuser means, means to mount said camera, said gas discharge tubes and said light diffuser means into a single compact housing, and means to mount said housing in closely spaced non-contacting operative relation to said workpiece continuous moving means.

5. The apparatus of claim 2, wherein each workpiece is radially scanned 256 times.

6. The apparatus of claim 2, said camera including a vidicon tube having X and Y axes deflection coils, said X and Y axes deflection coils each having a differing number of turns therein, said means to radially scan including means to convert the normal X-Y raster scanning pattern of said vidicon tube into said rotating radial scanning pattern, and said means to convert including means to feed different driving voltages to said X and Y coils respectively to compensate for the differing number of turns in said X and Y coils.

7. The apparatus of claim 6, said means to convert including a circuit arrangement of means to produce said different X and Y drive voltages; a sine wave generator, 90° phase offset means, and two ramp generators.

8. The apparatus of claim 2, and means to cause each said scan to inspect said workpiece for a plurality of elements expected to be found at a corresponding plurality of predetermined locations on each scan and for the presence of unexpected elements on each said scan.

9. The apparatus of claim 8, said means to cause including means to define a plurality of timing windows corresponding respectively to the corresponding plurality of elements expected to be found on each said radial scan.

10. The apparatus of claim 8, said workpieces comprising crown-type bottle caps, and said plurality of elements to be inspected comprising the center seal panel on the inside of each said cap, the annular seal rib on the radially outer edge of said center panel, and the fluted side wall of said cap.

11. Apparatus for optically inspecting crown-type bottle caps comprising an electronic camera, means to create a static optical image of the inside of each said bottle cap in said camera, means to radially scan each said image between the center and the radially outermost portions thereof with a plurality of radial scans which rotate around the center of each said cap, and means to inspect the center seal panel, the annular sealing rib and the fluted side wall of said cap during each of said radial scans.

12. The apparatus of claim 11, said camera including a vidicon tube having X and Y axes deflection coils, said X and Y axes deflection coils each having a differing number of turns therein, said means to radially scan including means to convert the normal X-Y raster scanning pattern of said vidicon tube into said rotating radial scanning pattern, and said means to convert including means to feed different driving voltages to said X and Y coils respectively to compensate for the differing number of turns in said X and Y coils.

13. The apparatus of claim 11, means to reject caps having irregularities determined during said radial scanning, and means to manually control the operation of said reject means based on faults found in a predetermined number of said radial scans and based on the absence of any fault found in others of said radial scans, whereby the quality level at which workpieces will be rejected can be controlled and set by said manual control means.

14. The apparatus of claim 11, said means to inspect including means to define a corresponding plurality of timing windows corresponding respectively to the correct locations of said center seal panel, said sealing rib and said fluted side wall as expected to be found on each said radial scan.

15. The apparatus of claim 11, wherein each cap is radially scanned 256 times.

16. The apparatus of claim 11, means to continuously move said caps with respect to said camera, pulsed illumination means, means to locate said electronic camera and said pulsed illumination means on one side of said caps so that light from said illumination means illuminates said caps to permit said electronic camera to produce said static optical image thereof, and means to trigger said pulsed illumination means each time a cap is in a predetermined position with respect to said camera to thereby create said static optical image.

17. The apparatus of claim 16, said means to convert including a circuit arrangement of means to produce said different X and Y drive voltages; a sine wave generator, 90° phase offset means, and two ramp generators.

18. The apparatus of claim 16, said pulsed illumination means comprising a plurality of gas discharge tubes arranged in a circular array concentrically with respect to said camera, light diffuser means, means to mount said camera, said gas discharge tubes and said light diffuser means into a single compact housing, and means to mount said housing in closely spaced non-contacting operative relation to said cap continuous moving means.

19. Apparatus for optically inspecting circular workpieces, said workpieces having a center circular plane portion and another portion extending in planes generally perpendicular to and annular around said center plane portion, comprising an electronic camera, means to cause said camera to create a static optical image of each of said workpieces, means to radially scan each said image between the middle of said circular plane and said annular portion with a plurality of radial scans which rotate around the center of each workpiece image, and means to inspect at least one feature in said center portion and at least one feature in said another annular portion during each of said radial scans.

20. The apparatus of claim 19, means to reject workpieces having irregularities determined during said radial scanning, and means to manually control the operation of said reject means based on faults found in a predetermined number of said radial scans and based on the absence of any fault found in others of said radial scans, whereby the quality level at which workpieces will be rejected can be controlled and set by said manual control means.

21. The apparatus of claim 19, wherein each workpiece is radially scanned 256 times.

22. The apparatus of claim 19, and means to inspect three features of each said workpiece on each such scan, said last mentioned means comprising means to define three separate timing windows to be superimposed on each scan, and means to locate said timing windows so as to correspond to the expected locations of said three features.

23. The apparatus of claim 22, said workpieces comprising crown-type bottle caps, and said three features to be inspected comprising the center seal panel on the inside of each said cap, the annular seal rib on the radially outer edge of said center panel, and the fluted side wall of said cap.

24. The apparatus of claim 19, means to continuously move said workpieces with respect to said camera, said means to create said static optical image comprising pulsed illumination means, means to locate said electronic camera and said pulsed illumination means on one side of said workpiece so that light from said illumination means illuminates said workpieces to permit said electronic camera to produce said static optical image thereof, and means to trigger said pulsed illumination means each time a workpiece is in a predetermined position with respect to said camera.

25. The apparatus of claim 24, said pulsed illumination means comprising a plurality of gas discharge tubes arranged in a circular array concentrically with respect to said camera, light diffuser means, means to mount said camera, said gas discharge tubes and said light diffuser means into a single compact housing, and means to mount said housing in closely spaced non-contacting operative relation to said workpiece continuous moving means.

26. The apparatus of claim 19, said camera including a vidicon tube having X and Y axes deflection coils, said X and Y axes deflection coils each having a differing number of turns therein, said means to radially scan including means to convert the normal X-Y raster scanning pattern of said vidicon tube into said rotating radial scanning pattern, and said means to convert including means to feed different driving voltages to said X and Y coils respectively to compensate for the differing number of turns in said X and Y coils.

27. The apparatus of claim 26, said means to convert including a circuit arrangement of means to produce said different X and Y drive voltages; a sine wave generator, 90° phase offset means, and two ramp generators.

28. Apparatus for converting a vidicon tube designed for X and Y axes raster deflection using X and Y axes deflection coils to perform radial deflection of the tube's electron beam outwardly from the center of said tube with a plurality of radial scans and with the scans rotating around the center of the tube, and wherein the tube includes differing numbers of turns in said X and Y deflection coils, comprising means to generate different driving voltages for said X and Y deflection coils respectively, a sine wave generator to generate a first sinusoidal signal, phase offset means to offset the phase of said first signal by 90° to thereby produce a second signal, two ramp generators, means to feed said first and second signals to said ramp generators to cause said ramp generators to output respective saw tooth waveforms that are amplitude modulated by said sinusoidal waveforms, and means to feed the outputs of said ramp generators together with said differing driving voltages to said X and Y deflection coils respectively.

29. The apparatus of claim 28, wherein said vidicon tube is used for optically inspecting circular workpieces, said vidicon tube comprising part of an electronic camera, means to continuously move said workpieces with respect to said camera, pulsed illumination means, means to trigger said pulsed illumination means each time a workpiece is in a predetermined position with respect to said camera to thereby permit said camera to create a static optical image of said moving workpiece, means to locate said electronic camera and said pulsed illumination means on one side of said workpiece so that light from said illumination means illuminates said workpieces to permit said electronic camera to produce said static optical image thereof, and means to radially scan said optical image of each workpiece between the center and the radially outermost portions thereof with a plurality of radial scans which rotate around the center of said circular workpiece.

30. The apparatus of claim 29, means to reject workpieces having irregularities determined during said radial scanning, and means to manually control the operation of said reject means based on faults found in a predetermined number of said radial scans and based on the absence of any fault found in others of said radial scans, whereby the quality level at which workpieces will be rejected can be controlled and set by said manual control means.

31. The apparatus of claim 29, said pulsed illumination means comprising a plurality of gas discharge tubes arranged in a circular array concentrically with respect to said camera, light diffuser means, means to mount said camera, said gas discharge tubes and said light diffuser means into a single compact housing, and means to mount said housing in closely spaced non-contacting operative relation to said workpiece continuous moving means.

32. The apparatus of claim 29, wherein each workpiece is radially scanned 256 times.

33. The apparatus of claim 29, and means to cause each said scan to inspect said workpiece for a plurality of elements expected to be found at a corresponding plurality of predetermined locations on each scan and for the presence of unexpected elements on each said scan.

34. The apparatus of claim 33, said means to cause including means to define a plurality of timing windows corresponding respectively to the corresponding plurality of elements expected to be found on each said radial scan.

35. The apparatus of claim 33, said workpieces comprising crown-type bottle caps, and said plurality of elements to be inspected comprising the center seal panel on the inside of each said cap, the annular seal rib on the radially outer edge of said center panel, and the fluted side wall of said cap.

36. In an optical inspection system for individually inspecting a plurality of continuously moving opaque workpieces, the combination comprising an electronic camera, a plurality of gas discharge tubes, means to arrange said tubes in an array concentrically with respect to said camera, light diffuser means, means to mount said camera, said tubes and said diffuser means into a single compact housing, means to mount said housing in closely spaced but non-contacting relation to said moving workpieces, and means to trigger said gas discharge tubes each time a workpiece is at a predetermined position with respect to said camera to form a static optical image of the portion of said workpiece in said predetermined position and in the field of view of said electronic camera and illuminated by light from said gas discharge tubes.

37. The system of claim 36, said workpieces comprising circular workpieces, and means to radially scan said static image of each workpiece between the center and the radially outermost portions thereof with a plurality of radial scans which rotate around the center of said circular workpiece.

38. The system of claim 37, said camera including a vidicon tube having X and Y axes deflection coils, said X and Y axes deflection coils each having a differing number of turns therein, said means to radially scan including means to convert the normal X-Y raster scanning pattern of said vidicon tube into said rotating radial scanning pattern, and said means to convert including means to feed different driving voltages to said X and Y coils respectively to compensate for the differing number of turns in said X and Y coils.

39. The apparatus of claim 37, said means to convert including a circuit arrangement of means to produce said different X and Y drive voltages; a sine wave generator, 90° phase offset means, and two ramp generators.

40. The apparatus of claim 37, means to reject workpieces having irregularities determined during said radial scanning, and means to manually control the operation of said reject means based on faults found in a predetermined number of said radial scans and based on the absence of any fault found in others of said radial scans, whereby the quality level at which workpieces will be rejected can be controlled and set by said manual control means.

41. The system of claim 37, said workpieces comprising crown-type bottle caps, and said plurality of elements to be inspected comprising the center seal panel on the inside of each said cap, the annular seal rib on the radially outer edge of said center panel, and the fluted side wall of said cap.

42. The system of claim 37, wherein each workpiece is radially scanned 256 times.

43. The system of claim 37, and means to cause each said scan to inspect said workpiece for a plurality of elements expected to be found at a corresponding plurality of predetermined locations on each scan and for the presence of unexpected elements on each said scan.

44. The system of claim 43, said means to cause including means to define a plurality of timing windows corresponding respectively to the corresponding plurality of elements expected to be found on each said radial scan.

45. A method for optically inspecting opaque circular workpieces comprising the steps of providing an electronic camera, continuously moving said workpieces with respect to said camera, providing pulsed illumination means, triggering said pulsed illumination means each time a workpiece is in a predetermined position with respect to said camera to thereby permit said camera to create a optical static image of said moving workpiece, locating said electronic camera so as to form said static optical image of the portion of said workpiece in said predetermined position and in the field of view of said electrionic camera and illuminated by light from said gas discharge tubes, radially scanning said image of each workpiece between the center and the radially outermost portions thereof with a plurality of radial scans, and rotating said scans around the center of said circular workpiece.

46. The method of claim 45, said camera including a vidicon tube having X and Y axes deflection coils each having a differing number of turns, said step of radially scanning including the step of converting the normal X-Y raster scanning pattern of said vidicon tube into said rotating radial scanning pattern, and said converting step including the step of feeding different driving voltages to said X and Y coils respectively to compensate for the differing number of turns in said X and Y coils.

47. The method of claim 45, and the steps of rejecting workpieces having irregularities determined during said radial scanning step, and manually controlling workpiece rejection based on faults found in a predetermined number of said radial scans and based on the absence of any fault found in others of said radial scans, whereby the quality level at which workpieces will be rejected can be controlled and set by said manual control step.

48. The method of claim 45, and inspecting each said workpiece for a plurality of elements expected to be found at a corresponding plurality of predetermined locations on each scan and for the presence of unexpected elements on each said scan.

49. The method of claim 45, wherein during said radial scanning step each workpiece is radially scanned 256 times.

50. The method of claim 45, and said last mentioned inspecting step including a step of defining a plurality of timing windows corresponding respectively to the corresponding plurality of elements expected to be found on each said radial scan.

51. The method of claim 50, wherein said workpieces comprise crown-type bottle caps and said plurality of elements to be inspected comprise the center seal panel on the inside of each said cap, the annular seal rib on the radially outer edge of said center panel, and the fluted side wall of said cap.

52. A method for optically inspecting crown-type bottle caps comprising the steps of providing an electronic camera, creating a static image of the inside of each said bottle cap in said camera, radially scanning each said image between the center and the radially outermost portions thereof with a plurality of radial scans and rotating the scan lines around the center of each said cap, and inspecting the center seal panel, the annular sealing rib and the fluted side wall of each of said caps during each of said radial scans.

53. The method of claim 52, and radially scanning each cap 256 times during each said scanning step.

54. The method of claim 52, said camera including a vidicon tube having X and Y axes deflection coils each having a different number of turns therein, said step of radially scanning including the step of converting the normal X-Y raster scanning pattern of said vidicon tube into said rotating radial scanning pattern, and said converting step including the step of feeding different driving voltages to said X and Y coils respectively to compensate for the differing number of turns in said X and Y coils.

55. The method of claim 52, and the steps of rejecting caps having irregularities determined during said radial scanning, and manually controlling cap rejection based on faults found in a predetermined number of said radial scans and based on the absence of any fault found in others of said radial scans, whereby the quality level at which caps will be rejected can be controlled and set by said manual controlling step.

56. The method of claim 52, and said inspecting step including a step of defining a plurality of timing windows corresponding respectively to the correct locations of said center seal panel, said sealing rib and said fluted side wall as expected to be found on each said radial scan.

57. The method of claim 52, and the steps of continuously moving said caps with respect to said camera, providing pulsed illumination means, locating said electronic camera so as to form a static optical image of the portion of said workpiece in said predetermined position and in the field of view of said electronic camera and illuminated by light from said gas discharge tubes, and triggering said pulsed illumination means each time a cap is in a predetermined position with respect to said camera to thereby create said static optical image.

58. A method for optically inspecting circular workpieces, said workpieces having a center circular plane portion and another portion extending in planes generally perpendicular to and annular around said center plane portion, comprising the steps of providing an electronic camera, causing said camera to create a static optical image of each of said workpieces, radially scanning each said image between the middle of said circular plane and said annular portion with a plurality of radial scans, causing said scans to rotate around the center of each workpiece image, and inspecting at least one feature in said center portion and at least one feature in said another annular portion during each of said radial scans.

59. The method of claim 58, and the steps of continuously moving said workpieces with respect to said camera, said step of causing said camera to create said static image comprising the step of providing pulsed illumination means, locating said electronic camera so as to form a static optical image of the portion of said workpiece in said predetermined position and in the field of view of said electronic camera and illuminated by light from said gas discharge tubes, and triggering said pulsed illumination means each time a workpiece is in a predetermined position with respect to said camera.

60. The method of claim 58, said camera including a vidicon tube having X and Y axes deflection coils each having a differing number of turns therein, said steps of radially scanning including the step of converting the normal X-Y raster scanning pattern of said vidicon tube into said rotating radial scanning pattern, and said converting step including the step of feeding different driving voltages to said X and Y coils respectively to compensate for the differing number of turns in said X and Y coils.

61. The method of claim 58, and the steps of rejecting workpieces having irregularities determined during said radial scanning step, and manually controlling workpiece rejection based on faults found in a predetermined number of said radial scans and based on the absence of any fault found in others of said radial scans, whereby the quality level at which workpieces will be rejected can be controlled and set by said manual control step.

62. The method of claim 58, wherein during said radial scanning step each workpiece is radially scanned 256 times.

63. The method of claim 58, and the steps to inspecting three features of each said workpiece on each such scan, said last mentioned step being performed by defining three separate timing windows superimposed on each scan and locating said timing windows so as to correspond to the expected locations of said three features.

64. The method of claim 63, wherein said workpieces comprise crown-type bottle caps and said three features to be inspected comprise the center seal panel on the inside of each said cap, the annular seal rib on the radially outer edge of said center panel, and the fluted side wall of said cap.

65. A method for converting a vidicon tube designed for X and Y axes raster deflection using X and Y axes deflection coils to perform radial deflection of the tube's electron beam outwardly from the center of said tube with a plurality of radial scans and with the scans around the center of the tube, and wherein the tube includes differing numbers of turns in said X and Y deflection coils, comprising the steps of generating different driving voltages for said X and Y deflection coils respectively, providing a sine wave generator to generate a first sinusoidal signal, offsetting the phase of said first signal by 90° to thereby produce a second signal, providing two ramp generators, feeding said first and second signals to said ramp generators to cause said ramp generators to output respective saw tooth waveforms that are amplitude modulated by said sinusoidal waveforms, and feeding the outputs of said ramp generators together with said differing driving voltages to said X and Y deflection coils respectively.

66. The method of claim 65, and the steps of using said vidicon tube to optically inspect circular workpieces, providing an electronic camera which includes said vidicon tube, continuously moving said workpieces with respect to said camera, providing pulsed illumination means, triggering said pulsed illumination means each time a workpiece is in a predetermined position with respect to said camera to thereby permit said camera to create a static optical image of said moving workpiece, radially scanning said image of each workpiece between the center and the radially outermost portions thereof with a plurality of radial scans, and rotating said scans around the center of said circular workpiece.

67. The method of claim 66, wherein each workpiece is radially scanned 256 times during said radial scanning step.

68. The method of claim 66, and the steps of rejecting workpieces having irregularities determined during said radial scanning step, and manually controlling workpiece rejection based on faults found in a predetermined number of said radial scans and based on the absence of any fault found in others of said radial scans, whereby the quality level at which workpieces will be rejected can be controlled and set by said manual control step.

69. The method of claim 66, and inspecting said workpiece for a plurality of elements expected to be found at a corresponding plurality of predetermined locations on each scan and for the presence of unexpected elements on each said scan.

70. The method of claim 69, and performing said inspecting step by defining a plurality of timing windows corresponding respectively to the corresponding plurality of elements expected to be found on each said radial scan.

71. The method of claim 69, wherein said workpieces comprise crown-type bottle caps and said plurality of elements to be inspected comprise the center seal panel on the inside of each said cap, the annular seal rib on the radially outer edge of said center panel, and the fluted side wall of said cap.

72. A method for individually inspecting a plurality of continuously moving opaque workpieces, comprising the steps of providing an electronic camera and a plurality of gas discharge tubes, arranging said tubes in an array concentrically with respect to said camera, providing light diffuser means, mounting said camera, said tubes and said diffuser means into a single compact housing, mounting said housing in closely spaced but non-contacting relation to said moving workpieces, and triggering said gas discharge tubes each time workpiece is at a predetermined position with respect to said camera to thereby form a static optical image of the portion of said workpiece in said predetermined position and in the field of view of said electronic camera and illuminated by light from said gas discharge tubes.

73. The method of claim 72, wherein said workpieces are circular workpieces, radially scanning said image of each workpiece between the center and the radially outermost portions thereof with a plurality of radial scans, and rotating said radial scans around the center of said circular workpiece.

74. The method of claim 73, said camera including a vidicon tube having X and Y axes deflection coils each having a differing number of turns therein, said step of radially scanning including the step of converting the normal X-Y raster scanning pattern of said vidicon tube into said rotating radial scanning pattern, and said converting step including the step of feeding different driving voltages to said X and Y coils respectively to compensate for the differing number of turns in said X and Y coils.

75. The method of claim 73, and the steps of rejecting workpieces having irregularities determined during said radial scanning step, and manually controlling workpiece rejection based on faults found in a predetermined number of said radial scans and based on the absence of any fault found in others of said radial scans, whereby the quality level at which workpieces will be rejected can be controlled and set by said manual control step.

76. The method of claim 73, wherein each workpiece is radially scanned 256 times during the radial scan step.

77. The method of claim 73, and inspecting said workpiece for a plurality of elements expected to be found at a corresponding plurality of predetermined locations on each scan and for the presence of unexpected elements on each said scan.

78. The method of claim 77, said inspecting step including a step of defining a plurality of timing windows corresponding respectively to the corresponding plurality of elements expected to be found on each said radial scan.

79. The method of claim 77, wherein said workpieces comprise crown-type bottle caps and said plurality of elements to be inspected comprise the center seal panel on the inside of each said cap, the annular seal rib on the radially outer edge of said center panel, and the fluted side wall of said cap.

* * * * *